US012804593B2

(12) United States Patent
Wang et al.

(10) Patent No.: US 12,804,593 B2
(45) Date of Patent: Nov. 17, 2026

(54) PRECISE POSITIONING RECEIVER CLOCK ESTIMATION WITHOUT PRIMARY SIGNAL DEPENDENCY

(71) Applicant: QUALCOMM Incorporated, San Diego, CA (US)

(72) Inventors: Min Wang, Tustin, CA (US); James Stephen, Lake Forest, CA (US); Yinghua Yang, San Jose, CA (US); Ning Luo, Cupertino, CA (US)

(73) Assignee: QUALCOMM Incorporated, San Diego, CA (US)

(*) Notice: Subject to any disclaimer, the term of this patent is extended or adjusted under 35 U.S.C. 154(b) by 563 days.

(21) Appl. No.: 18/329,408

(22) Filed: Jun. 5, 2023

(65) Prior Publication Data

US 2024/0406928 A1 Dec. 5, 2024

(51) Int. Cl.
*H04W 64/00* (2009.01)

(52) U.S. Cl.
CPC ................................ *H04W 64/006* (2013.01)

(58) Field of Classification Search
CPC ......................... H04W 64/006; H04W 64/003
USPC ...................................................... 455/456.1
See application file for complete search history.

(56) References Cited

U.S. PATENT DOCUMENTS 7,576,690 B2 * 8/2009 Vollath .................... G01S 19/43 342/357.44
9,052,374 B2 * 6/2015 Bromley ............... G01S 19/254
2007/0120733 A1 * 5/2007 Vollath .................... G01S 19/44 342/357.27
2014/0062776 A1 * 3/2014 Ferguson ............. G01S 19/072 342/357.41
2014/0306842 A1 * 10/2014 Alizadeh-Shabdiz ....................... G01S 19/13 342/357.51
2015/0369924 A1 * 12/2015 Hedgecock ............. G01S 19/51 342/357.34
2020/0158885 A1 * 5/2020 Chen ....................... G01S 19/44

OTHER PUBLICATIONS

International Search Report and Written Opinion—PCT/US2024/024014—ISA/EPO—Jul. 23, 2024.

* cited by examiner

*Primary Examiner* — Qutbuddin Ghulamali
(74) *Attorney, Agent, or Firm* — Weaver Austin Villeneuve & Sampson LLP

(57) ABSTRACT

A positioning method includes: receiving, at an apparatus from a first signal source, a first positioning signal; determining, at the apparatus, a first receiver clock value with respect to the first positioning signal; determining, at the apparatus in response to loss of reception of the first positioning signal, a drift of the first receiver clock value using delta carrier phase updating based on one or more available positioning signals; and determining, at the apparatus, a second receiver clock value based on the first receiver clock value and the drift of the first receiver clock value.

20 Claims, 7 Drawing Sheets

PRECISE POSITIONING RECEIVER CLOCK ESTIMATION WITHOUT PRIMARY SIGNAL DEPENDENCY

BACKGROUND

Wireless communication systems have developed through various generations, including a first-generation analog wireless phone service (1G), a second-generation (2G) digital wireless phone service (including interim 2.5G and 2.75G networks), a third-generation (3G) high speed data, Internet-capable wireless service, a fourth-generation (4G) service (e.g., Long Term Evolution (LTE) or WiMax), a fifth-generation (5G) service, etc. There are presently many different types of wireless communication systems in use, including Cellular and Personal Communications Service (PCS) systems. Examples of known cellular systems include the cellular Analog Advanced Mobile Phone System (AMPS), and digital cellular systems based on Code Division Multiple Access (CDMA), Frequency Division Multiple Access (FDMA), Orthogonal Frequency Division Multiple Access (OFDMA), Time Division Multiple Access (TDMA), the Global System for Mobile access (GSM) variation of TDMA, etc.

A fifth generation (5G) mobile standard calls for higher data transfer speeds, greater numbers of connections, and better coverage, among other improvements. The 5G standard, according to the Next Generation Mobile Networks Alliance, is designed to provide data rates of several tens of megabits per second to each of tens of thousands of users, with 1 gigabit per second to tens of workers on an office floor. Several hundreds of thousands of simultaneous connections should be supported in order to support large sensor deployments. Consequently, the spectral efficiency of 5G mobile communications should be significantly enhanced compared to the current 4G standard. Furthermore, signaling efficiencies should be enhanced and latency should be substantially reduced compared to current standards.

Positions of devices, such as mobile devices, may be determined using terrestrial-based positioning signals and/or satellite positioning signals. Satellite positioning system receivers may be included in various devices for receiving and measuring satellite positioning signals. Measurements of the satellite positioning signals may be processed to determine position information, such as ranges between satellites and the receiver and/or a position estimate for the receiver.

Referring to FIG. 7, a Real Time Kinematic (RTK) positioning system 700 includes satellites 711, 712, 713, 714, a reference station 720, a base station 730, and a user equipment (UE) (also known as an RTK rover) 740. Although only one reference station is shown in the system 700, more than one reference station may be included. The reference station 720 is shown separate from the base station 730, but the base station 730 may be included in the reference station 720. The location of the reference station 720 is well known, e.g., by the reference station 720 and/or the UE 740. In the system 700, the satellites 711-714 transmit positioning signals that are received by the reference station 720 and the UE 740. Raw positioning signal observations (carrier phase measurements) and/or corrections may be transmitted as correction data 750 by the reference station 720 via the base station 730 (e.g., a cellular base station) to the UE 740. The UE 740 may use the observations and/or measurements to make main errors that drive stand-alone positioning cancel out, allowing for centimeter-level accuracy of position estimates for the location of the UE 740.

SUMMARY

An example apparatus includes: one or more receivers configured to transduce wireless signals into guided signals; one or more memories; one or more processors, communicatively coupled to the one or more receivers and the one or more memories, configured to: receive a first positioning signal, corresponding to a first signal source, from the one or more receivers; determine a first receiver clock value with respect to the first positioning signal; determine, in response to loss of reception of the first positioning signal, a drift of the first receiver clock value using delta carrier phase updating based on one or more available positioning signals; and determine a second receiver clock value based on the first receiver clock value and the drift of the first receiver clock value.

An example positioning method includes: receiving, at an apparatus from a first signal source, a first positioning signal; determining, at the apparatus, a first receiver clock value with respect to the first positioning signal; determining, at the apparatus in response to loss of reception of the first positioning signal, a drift of the first receiver clock value using delta carrier phase updating based on one or more available positioning signals; and determining, at the apparatus, a second receiver clock value based on the first receiver clock value and the drift of the first receiver clock value.

An apparatus includes: means for receiving, from a first signal source, a first positioning signal; means for determining a first receiver clock value with respect to the first positioning signal; means for determining, in response to loss of reception of the first positioning signal, a drift of the first receiver clock value using delta carrier phase updating based on one or more available positioning signals; and means for determining a second receiver clock value based on the first receiver clock value and the drift of the first receiver clock value.

An example non-transitory, processor-readable storage medium comprising processor-readable instructions to cause a processor of an apparatus to: receive, from a first signal source, a first positioning signal; determine a first receiver clock value with respect to the first positioning signal; determine, in response to loss of reception of the first positioning signal, a drift of the first receiver clock value using delta carrier phase updating based on one or more available positioning signals; and determine a second receiver clock value based on the first receiver clock value and the drift of the first receiver clock value.

DETAILED DESCRIPTION

Figure 1:
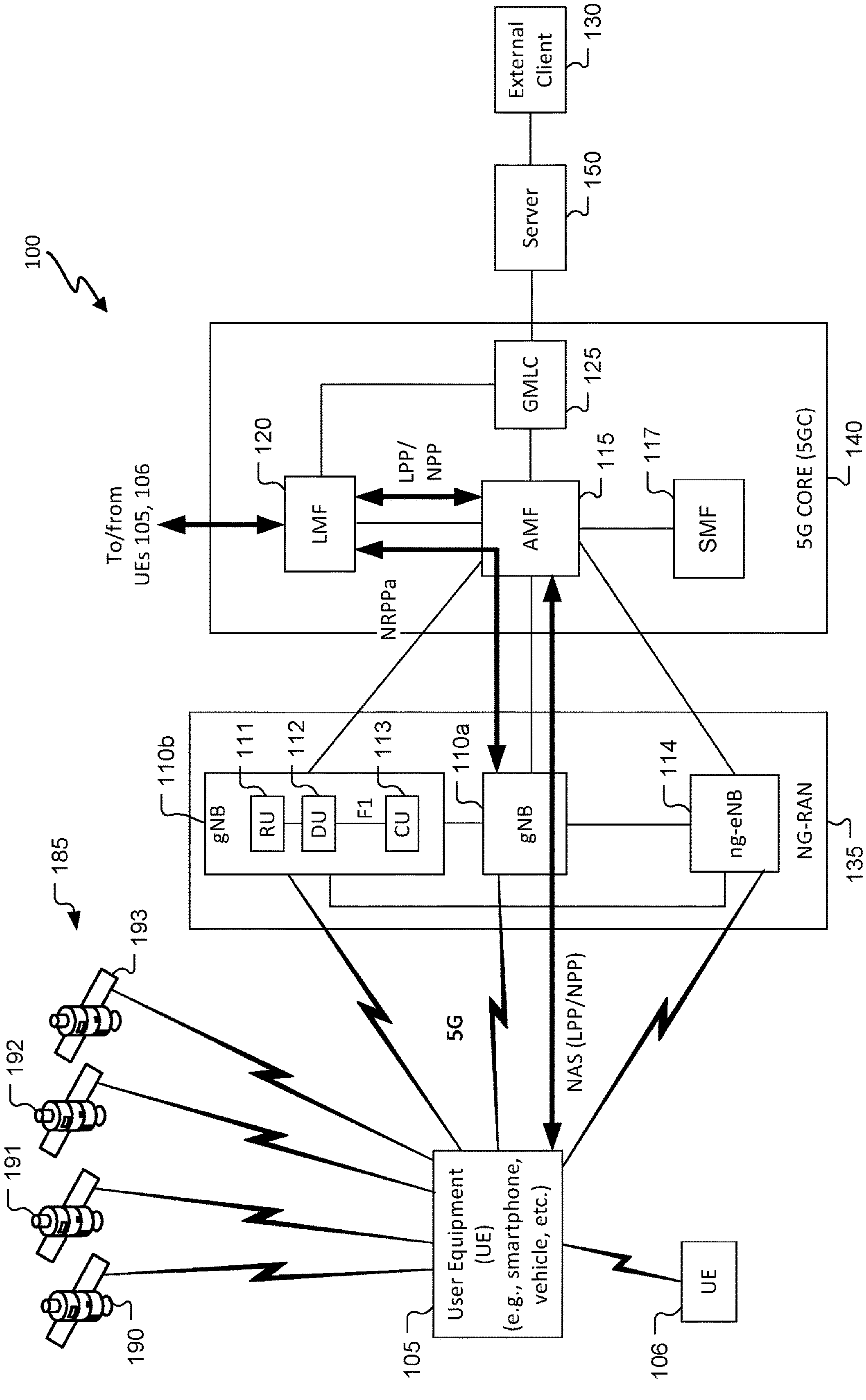
FIG. 1 is a simplified diagram of an example wireless communications system.

Techniques are discussed herein for receiver clock estimation absent a reference signal. For example, techniques are provided for processing methodologies for processing signals for RTK positioning. A precise positioning engine (PPE) may receive and process a reference signal to determine receiver clock estimations. In response to loss of the reference signal, the PPE may introduce a clock drift term and apply a recursive filter to determine a value of the clock drift term. The determined clock drift may be used to determine updated receiver clock terms, which may be used to determine position information such as one or more pseudoranges and/or one or more carrier phase measurements relative to one or more respective signal sources, e.g., satellites. The clock drift term may be precisely computed, e.g., using DCP (Delta Carrier Phase) updating and the precisely computed clock drift may be used to determine more accurate values of the receiver clock term (which may be used to determine position information) than using an empirical model to determine the receiver clock values. At each filter measurement update, e.g., of an enhanced Kalman filter (EKF), for each frequency band, an estimation of a clock term is determined.

Items and/or techniques described herein may provide one or more of the following capabilities, as well as other capabilities not mentioned. Receiver clocks may be estimated without dependency on a primary signal being received and processed. Accurate position information may be determined in the absence of a reference signal (e.g., after loss of a reference signal). Position estimation accuracy and outlier detection accuracy may be improved due to precise measurement of a clock rate dynamic rather than using an empirical model. A clock estimate term may be provided after a previously-received signal band ceases to be received, e.g., when "primary signal band" becomes unavailable, by estimating a common clock rate term crossing the different signal bands. Other capabilities may be provided and not every implementation according to the disclosure must provide any, let alone all, of the capabilities discussed.

Obtaining the locations of mobile devices that are accessing a wireless network may be useful for many applications including, for example, emergency calls, personal navigation, consumer asset tracking, locating a friend or family member, etc. Existing positioning methods include methods based on measuring radio signals transmitted from a variety of devices or entities including satellite vehicles (SVs) and terrestrial radio sources in a wireless network such as base stations and access points. It is expected that standardization for the 5G wireless networks will include support for various positioning methods, which may utilize reference signals transmitted by base stations in a manner similar to which LTE wireless networks currently utilize Positioning Reference Signals (PRS) and/or Cell-specific Reference Signals (CRS) for position determination.

The description herein may refer to sequences of actions to be performed, for example, by elements of a computing device. Various actions described herein can be performed by specific circuits (e.g., an application specific integrated circuit (ASIC)), by program instructions being executed by one or more processors, or by a combination of both. Sequences of actions described herein may be embodied within a non-transitory computer-readable medium having stored thereon a corresponding set of computer instructions that upon execution would cause an associated processor to perform the functionality described herein. Thus, the various examples described herein may be embodied in a number of different forms, all of which are within the scope of the disclosure, including claimed subject matter.

As used herein, the terms "user equipment" (UE) and "base station" are not specific to or otherwise limited to any particular Radio Access Technology (RAT), unless otherwise noted. In general, a UE may be any wireless communication device (e.g., a mobile phone, router, tablet computer, laptop computer, consumer asset tracking device, Internet of Things (IoT) device, etc.) used to communicate over a wireless communications network. A UE may be mobile or may (e.g., at certain times) be stationary, and may communicate with a Radio Access Network (RAN). As used herein, the term "UE" may be referred to interchangeably as an "access terminal" or "AT," a "client device." a "wireless device," a "subscriber device." a "subscriber terminal," a "subscriber station," a "user terminal" or UT, a "mobile terminal," a "mobile station," a "mobile device," or variations thereof. Generally, UEs can communicate with a core network via a RAN, and through the core network the UEs can be connected with external networks such as the Internet and with other UEs. Of course, other mechanisms of connecting to the core network and/or the Internet are also possible for the UEs, such as over wired access networks, WiFi networks (e.g., based on IEEE (Institute of Electrical and Electronics Engineers) 802.11, etc.) and so on.

A base station may operate according to one of several RATs in communication with UEs depending on the network in which it is deployed. Examples of a base station include an Access Point (AP), a Network Node, a NodeB, an evolved NodeB (eNB), or a general Node B (gNodeB, gNB). In addition, in some systems a base station may provide purely edge node signaling functions while in other systems it may provide additional control and/or network management functions.

UEs may be embodied by any of a number of types of devices including but not limited to printed circuit (PC) cards, compact flash devices, external or internal modems, wireless or wireline phones, smartphones, tablets, consumer asset tracking devices, asset tags, and so on. A communication link through which UEs can send signals to a RAN is called an uplink channel (e.g., a reverse traffic channel, a reverse control channel, an access channel, etc.). A communication link through which the RAN can send signals to UEs is called a downlink or forward link channel (e.g., a paging channel, a control channel, a broadcast channel, a forward traffic channel, etc.). As used herein the term traffic channel (TCH) can refer to either an uplink/reverse or downlink/forward traffic channel.

As used herein, the term "cell" or "sector" may correspond to one of a plurality of cells of a base station, or to the base station itself, depending on the context. The term "cell" may refer to a logical communication entity used for communication with a base station (for example, over a carrier), and may be associated with an identifier for distinguishing neighboring cells (for example, a physical cell identifier (PCID), a virtual cell identifier (VCID)) operating via the same or a different carrier. In some examples, a carrier may support multiple cells, and different cells may be configured according to different protocol types (for example, machine-type communication (MTC), narrowband Internet-of-Things (NB-IoT), enhanced mobile broadband (eMBB), or others) that may provide access for different types of devices. In some examples, the term "cell" may refer to a portion of a geographic coverage area (for example, a sector) over which the logical entity operates.

Referring to FIG. 1, an example of a communication system 100 includes a UE 105, a UE 106, a Radio Access Network (RAN), here a Fifth Generation (5G) Next Generation (NG) RAN (NG-RAN) 135, a 5G Core Network (5GC) 140, and a server 150. The UE 105 and/or the UE 106 may be, e.g., an IoT device, a location tracker device, a cellular telephone, a vehicle (e.g., a car, a truck, a bus, a boat, etc.), or another device. A 5G network may also be referred to as a New Radio (NR) network; NG-RAN 135 may be referred to as a 5G RAN or as an NR RAN; and 5GC 140 may be referred to as an NG Core network (NGC). Standardization of an NG-RAN and 5GC is ongoing in the 3rd Generation Partnership Project (3GPP). Accordingly, the NG-RAN 135 and the 5GC 140 may conform to current or future standards for 5G support from 3GPP. The NG-RAN 135 may be another type of RAN, e.g., a 3G RAN, a 4G Long Term Evolution (LTE) RAN, etc. The UE 106 may be configured and coupled similarly to the UE 105 to send and/or receive signals to/from similar other entities in the system 100, but such signaling is not indicated in FIG. 1 for the sake of simplicity of the figure. Similarly, the discussion focuses on the UE 105 for the sake of simplicity. The communication system 100 may utilize information from a constellation 185 of satellite vehicles (SVs) 190, 191, 192, 193 for a Satellite Positioning System (SPS) (e.g., a Global Navigation Satellite System (GNSS)) like the Global Positioning System (GPS), the Global Navigation Satellite System (GLONASS), Galileo, or Beidou or some other local or regional SPS such as the Indian Regional Navigational Satellite System (IRNSS), the European Geostationary Navigation Overlay Service (EGNOS), or the Wide Area Augmentation System (WAAS). Additional components of the communication system 100 are described below. The communication system 100 may include additional or alternative components.

As shown in FIG. 1, the NG-RAN 135 includes NR nodeBs (gNBs) 110*a*, 110*b*, and a next generation eNodeB (ng-eNB) 114, and the 5GC 140 includes an Access and Mobility Management Function (AMF) 115, a Session Management Function (SMF) 117, a Location Management Function (LMF) 120, and a Gateway Mobile Location Center (GMLC) 125. The gNBs 110*a*, 110*b* and the ng-eNB 114 are communicatively coupled to each other, are each configured to bi-directionally wirelessly communicate with the UE 105, and are each communicatively coupled to, and configured to bi-directionally communicate with, the AMF 115. The gNBs 110*a*, 110*b*, and the ng-eNB 114 may be referred to as base stations (BSs). The AMF 115, the SMF 117, the LMF 120, and the GMLC 125 are communicatively coupled to each other, and the GMLC is communicatively coupled to an external client 130. The SMF 117 may serve as an initial contact point of a Service Control Function (SCF) (not shown) to create, control, and delete media sessions. Base stations such as the gNBs 110*a*, 110*b* and/or the ng-eNB 114 may be a macro cell (e.g., a high-power cellular base station), or a small cell (e.g., a low-power cellular base station), or an access point (e.g., a short-range base station configured to communicate with short-range technology such as WiFi, WiFi-Direct (WiFi-D), Bluetooth®, Bluetooth®-low energy (BLE), Zigbee, etc. One or more base stations, e.g., one or more of the gNBs 110*a*, 110*b* and/or the ng-eNB 114 may be configured to communicate with the UE 105 via multiple carriers. Each of the gNBs 110*a*, 110*b* and/or the ng-eNB 114 may provide communication coverage for a respective geographic region, e.g., a cell. Each cell may be partitioned into multiple sectors as a function of the base station antennas.

FIG. 1 provides a generalized illustration of various components, any or all of which may be utilized as appropriate, and each of which may be duplicated or omitted as necessary. Specifically, although one UE 105 is illustrated, many UEs (e.g., hundreds, thousands, millions, etc.) may be utilized in the communication system 100. Similarly, the communication system 100 may include a larger (or smaller) number of SVs (i.e., more or fewer than the four SVs 190-193 shown), gNBs 110*a*, 110*b*, ng-eNBs 114, AMFs 115, external clients 130, and/or other components. The illustrated connections that connect the various components in the communication system 100 include data and signaling connections which may include additional (intermediary) components, direct or indirect physical and/or wireless connections, and/or additional networks. Furthermore, components may be rearranged, combined, separated, substituted, and/or omitted, depending on desired functionality.

While FIG. 1 illustrates a 5G-based network, similar network implementations and configurations may be used for other communication technologies, such as 3G, Long Term Evolution (LTE), etc. Implementations described herein (be they for 5G technology and/or for one or more other communication technologies and/or protocols) may be used to transmit (or broadcast) directional synchronization signals, receive and measure directional signals at UEs (e.g., the UE 105) and/or provide location assistance to the UE 105 (via the GMLC 125 or other location server) and/or compute a location for the UE 105 at a location-capable device such as the UE 105, the gNB 110*a*, 110*b*, or the LMF 120 based on measurement quantities received at the UE 105 for such directionally-transmitted signals. The gateway mobile location center (GMLC) 125, the location management function (LMF) 120, the access and mobility management function (AMF) 115, the SMF 117, the ng-eNB (eNodeB) 114 and the gNBs (gNodeBs) 110*a*, 110*b* are examples and may, in various embodiments, be replaced by or include various other location server functionality and/or base station functionality respectively.

The system 100 is capable of wireless communication in that components of the system 100 can communicate with one another (at least some times using wireless connections) directly or indirectly, e.g., via the gNBs 110*a*, 110*b*, the ng-eNB 114, and/or the 5GC 140 (and/or one or more other devices not shown, such as one or more other base transceiver stations). For indirect communications, the communications may be altered during transmission from one entity to another, e.g., to alter header information of data packets, to change format, etc. The UE 105 may include multiple UEs and may be a mobile wireless communication device, but may communicate wirelessly and via wired connections. The UE 105 may be any of a variety of devices, e.g., a smartphone, a tablet computer, a vehicle-based device, etc., but these are examples as the UE 105 is not required to be any of these configurations, and other configurations of UEs may be used. Other UEs may include wearable devices (e.g., smart watches, smart jewelry, smart glasses or headsets, etc.). Still other UEs may be used, whether currently existing or developed in the future. Further, other wireless devices (whether mobile or not) may be implemented within the system 100 and may communicate with each other and/or with the UE 105, the gNBs 110*a*, 110*b*, the ng-eNB 114, the 5GC 140, and/or the external client 130. For example, such other devices may include internet of thing (IoT) devices, medical devices, home entertainment and/or automation devices, etc. The 5GC 140 may communicate with the external client 130 (e.g., a computer system), e.g., to allow the external client 130 to request and/or receive location information regarding the UE 105 (e.g., via the GMLC 125).

The UE 105 or other devices may be configured to communicate in various networks and/or for various purposes and/or using various technologies (e.g., 5G, Wi-Fi communication, multiple frequencies of Wi-Fi communication, satellite positioning, one or more types of communications (e.g., GSM (Global System for Mobiles), CDMA (Code Division Multiple Access), LTE (Long Term Evolution), V2X (Vehicle-to-Everything, e.g., V2P (Vehicle-to-Pedestrian), V2I (Vehicle-to-Infrastructure), V2V (Vehicle-to-Vehicle), etc.), IEEE 802.11 p, etc.). V2X communications may be cellular (Cellular-V2X (C-V2X)) and/or WiFi (e.g., DSRC (Dedicated Short-Range Connection)). The system 100 may support operation on multiple carriers (waveform signals of different frequencies). Multi-carrier transmitters can transmit modulated signals simultaneously on the multiple carriers. Each modulated signal may be a Code Division Multiple Access (CDMA) signal, a Time Division Multiple Access (TDMA) signal, an Orthogonal Frequency Division Multiple Access (OFDMA) signal, a Single-Carrier Frequency Division Multiple Access (SC-FDMA) signal, etc. Each modulated signal may be sent on a different carrier and may carry pilot, overhead information, data, etc. The UEs 105, 106 may communicate with each other through UE-to-UE sidelink (SL) communications by transmitting over one or more sidelink channels such as a physical sidelink synchronization channel (PSSCH), a physical sidelink broadcast channel (PSBCH), or a physical sidelink control channel (PSCCH). Direct wireless-device-to-wireless-device communications without going through a network may be referred to generally as sidelink communications without limiting the communications to a particular protocol.

The UE 105 may comprise and/or may be referred to as a device, a mobile device, a wireless device, a mobile terminal, a terminal, a mobile station (MS), a Secure User Plane Location (SUPL) Enabled Terminal (SET), or by some other name. Moreover, the UE 105 may correspond to a cellphone, smartphone, laptop, tablet, PDA, consumer asset tracking device, navigation device, Internet of Things (IoT) device, health monitors, security systems, smart city sensors, smart meters, wearable trackers, or some other portable or moveable device. Typically, though not necessarily, the UE 105 may support wireless communication using one or more Radio Access Technologies (RATs) such as Global System for Mobile communication (GSM), Code Division Multiple Access (CDMA), Wideband CDMA (WCDMA), LTE, High Rate Packet Data (HRPD), IEEE 802.11 WiFi (also referred to as Wi-Fi), Bluetooth® (BT), Worldwide Interoperability for Microwave Access (WiMAX), 5G new radio (NR) (e.g., using the NG-RAN 135 and the 5GC 140), etc. The UE 105 may support wireless communication using a Wireless Local Area Network (WLAN) which may connect to other networks (e.g., the Internet) using a Digital Subscriber Line (DSL) or packet cable, for example. The use of one or more of these RATs may allow the UE 105 to communicate with the external client 130 (e.g., via elements of the 5GC 140 not shown in FIG. 1, or possibly via the GMLC 125) and/or allow the external client 130 to receive location information regarding the UE 105 (e.g., via the GMLC 125).

The UE 105 may include a single entity or may include multiple entities such as in a personal area network where a user may employ audio, video and/or data I/O (input/output) devices and/or body sensors and a separate wireline or wireless modem. An estimate of a location of the UE 105 may be referred to as a location, location estimate, location fix, fix, position, position estimate, or position fix, and may be geographic, thus providing location coordinates for the UE 105 (e.g., latitude and longitude) which may or may not include an altitude component (e.g., height above sea level, height above or depth below ground level, floor level, or basement level). Alternatively, a location of the UE 105 may be expressed as a civic location (e.g., as a postal address or the designation of some point or small area in a building such as a particular room or floor). A location of the UE 105 may be expressed as an area or volume (defined either geographically or in civic form) within which the UE 105 is expected to be located with some probability or confidence level (e.g., 67%, 95%, etc.). A location of the UE 105 may be expressed as a relative location comprising, for example, a distance and direction from a known location. The relative location may be expressed as relative coordinates (e.g., X. Y (and Z) coordinates) defined relative to some origin at a known location which may be defined, e.g., geographically, in civic terms, or by reference to a point, area, or volume, e.g., indicated on a map, floor plan, or building plan. In the description contained herein, the use of the term location may comprise any of these variants unless indicated otherwise. When computing the location of a UE, it is common to solve for local x, y, and possibly z coordinates and then, if desired, convert the local coordinates into absolute coordinates (e.g., for latitude, longitude, and altitude above or below mean sea level).

The UE 105 may be configured to communicate with other entities using one or more of a variety of technologies. The UE 105 may be configured to connect indirectly to one or more communication networks via one or more device-to-device (D2D) peer-to-peer (P2P) links. The D2D P2P links may be supported with any appropriate D2D radio access technology (RAT), such as LTE Direct (LTE-D), WiFi Direct (WiFi-D), Bluetooth®, and so on. One or more of a group of UEs utilizing D2D communications may be within a geographic coverage area of a Transmission/Reception Point (TRP) such as one or more of the gNBs 110*a*, 110*b*, and/or the ng-eNB 114. Other UEs in such a group may be outside such geographic coverage areas, or may be otherwise unable to receive transmissions from a base station. Groups of UEs communicating via D2D communications may utilize a one-to-many (1:M) system in which each UE may transmit to other UEs in the group. A TRP may facilitate scheduling of resources for D2D communications. In other cases, D2D communications may be carried out between UEs without the involvement of a TRP. One or more of a group of UEs utilizing D2D communications may be within a geographic coverage area of a TRP. Other UEs in such a group may be outside such geographic coverage areas, or be otherwise unable to receive transmissions from a base station. Groups of UEs communicating via D2D communications may utilize a one-to-many (1:M) system in which each UE may transmit to other UEs in the group. A TRP may facilitate scheduling of resources for D2D communications. In other cases, D2D communications may be carried out between UEs without the involvement of a TRP.

Base stations (BSs) in the NG-RAN 135 shown in FIG. 1 include NR Node Bs, referred to as the gNBs 110*a* and 110*b*. Pairs of the gNBs 110*a*, 110*b* in the NG-RAN 135 may be connected to one another via one or more other gNBs. Access to the 5G network is provided to the UE 105 via wireless communication between the UE 105 and one or more of the gNBs 110*a*. 110*b*, which may provide wireless communications access to the 5GC 140 on behalf of the UE 105 using 5G. In FIG. 1, the serving gNB for the UE 105 is assumed to be the gNB 110*a*, although another gNB (e.g., the gNB 110*b*) may act as a serving gNB if the UE 105 moves to another location or may act as a secondary gNB to provide additional throughput and bandwidth to the UE 105.

Base stations (BSs) in the NG-RAN 135 shown in FIG. 1 may include the ng-eNB 114, also referred to as a next generation evolved Node B. The ng-eNB 114 may be connected to one or more of the gNBs 110*a*, 110*b* in the NG-RAN 135, possibly via one or more other gNBs and/or one or more other ng-eNBs. The ng-eNB 114 may provide LTE wireless access and/or evolved LTE (ELTE) wireless access to the UE 105. One or more of the gNBs 110*a*, 110*b* and/or the ng-eNB 114 may be configured to function as positioning-only beacons which may transmit signals to assist with determining the position of the UE 105 but may not receive signals from the UE 105 or from other UEs.

The gNBs 110*a*, 110*b* and/or the ng-eNB 114 may each comprise one or more TRPs. For example, each sector within a cell of a BS may comprise a TRP, although multiple TRPs may share one or more components (e.g., share a processor but have separate antennas). The system 100 may include macro TRPs exclusively or the system 100 may have TRPs of different types, e.g., macro, pico, and/or femto TRPs, etc. A macro TRP may cover a relatively large geographic area (e.g., several kilometers in radius) and may allow unrestricted access by terminals with service subscription. A pico TRP may cover a relatively small geographic area (e.g., a pico cell) and may allow unrestricted access by terminals with service subscription. A femto or home TRP may cover a relatively small geographic area (e.g., a femto cell) and may allow restricted access by terminals having association with the femto cell (e.g., terminals for users in a home).

Each of the gNBs 110*a*, 110*b* and/or the ng-eNB 114 may include a radio unit (RU), a distributed unit (DU), and a central unit (CU). For example, the gNB 110*b* includes an RU 111, a DU 112, and a CU 113. The RU 111, DU 112, and CU 113 divide functionality of the gNB 110*b*. While the gNB 110*b* is shown with a single RU, a single DU, and a single CU, a gNB may include one or more RUs, one or more DUs, and/or one or more CUs. An interface between the CU 113 and the DU 112 is referred to as an F1 interface. The RU 111 is configured to perform digital front end (DFE) functions (e.g., analog-to-digital conversion, filtering, power amplification, transmission/reception) and digital beamforming, and includes a portion of the physical (PHY) layer. The RU 111 may perform the DFE using massive multiple input/multiple output (MIMO) and may be integrated with one or more antennas of the gNB 110*b*. The DU 112 hosts the Radio Link Control (RLC), Medium Access Control (MAC), and physical layers of the gNB 110*b*. One DU can support one or more cells, and each cell is supported by a single DU. The operation of the DU 112 is controlled by the CU 113. The CU 113 is configured to perform functions for transferring user data, mobility control, radio access network sharing, positioning, session management, etc. although some functions are allocated exclusively to the DU 112. The CU 113 hosts the Radio Resource Control (RRC), Service Data Adaptation Protocol (SDAP), and Packet Data Convergence Protocol (PDCP) protocols of the gNB 110*b*. The UE 105 may communicate with the CU 113 via RRC. SDAP, and PDCP layers, with the DU 112 via the RLC, MAC, and PHY layers, and with the RU 111 via the PHY layer.

As noted, while FIG. 1 depicts nodes configured to communicate according to 5G communication protocols, nodes configured to communicate according to other communication protocols, such as, for example, an LTE protocol or IEEE 802.11x protocol, may be used. For example, in an Evolved Packet System (EPS) providing LTE wireless access to the UE 105, a RAN may comprise an Evolved Universal Mobile Telecommunications System (UMTS) Terrestrial Radio Access Network (E-UTRAN) which may comprise base stations comprising evolved Node Bs (eNBs). A core network for EPS may comprise an Evolved Packet Core (EPC). An EPS may comprise an E-UTRAN plus EPC, where the E-UTRAN corresponds to the NG-RAN 135 and the EPC corresponds to the 5GC 140 in FIG. 1.

The gNBs 110*a*, 110*b* and the ng-eNB 114 may communicate with the AMF 115, which, for positioning functionality, communicates with the LMF 120. The AMF 115 may support mobility of the UE 105, including cell change and handover and may participate in supporting a signaling connection to the UE 105 and possibly data and voice bearers for the UE 105. The LMF 120 may communicate directly with the UE 105, e.g., through wireless communications, or directly with the gNBs 110*a*, 110*b* and/or the ng-eNB 114. The LMF 120 may support positioning of the UE 105 when the UE 105 accesses the NG-RAN 135 and may support position procedures/methods such as Assisted GNSS (A-GNSS), Observed Time Difference of Arrival (OTDOA) (e.g., Downlink (DL) OTDOA or Uplink (UL) OTDOA), Round Trip Time (RTT), Multi-Cell RTT, Real Time Kinematic (RTK), Precise Point Positioning (PPP), Differential GNSS (DGNSS), Enhanced Cell ID (E-CID), angle of arrival (AoA), angle of departure (AoD), and/or other position methods. The LMF 120 may process location services requests for the UE 105, e.g., received from the AMF 115 or from the GMLC 125. The LMF 120 may be connected to the AMF 115 and/or to the GMLC 125. The LMF 120 may be referred to by other names such as a Location Manager (LM), Location Function (LF), commercial LMF (CLMF), or value added LMF (VLMF). A node/system that implements the LMF 120 may additionally or alternatively implement other types of location-support modules, such as an Enhanced Serving Mobile Location Center (E-SMLC) or a Secure User Plane Location (SUPL) Location Platform (SLP). At least part of the positioning functionality (including derivation of the location of the UE 105) may be performed at the UE 105 (e.g., using signal measurements obtained by the UE 105 for signals transmitted by wireless nodes such as the gNBs 110*a*, 110*b* and/or the ng-eNB 114, and/or assistance data provided to the UE 105, e.g., by the LMF 120). The AMF 115 may serve as a control node that processes signaling between the UE 105 and the 5GC 140, and may provide QoS (Quality of Service) flow and session management. The AMF 115 may support mobility of the UE 105 including cell change and handover and may participate in supporting signaling connection to the UE 105.

The server 150, e.g., a cloud server, is configured to obtain and provide location estimates of the UE 105 to the external client 130. The server 150 may, for example, be configured to run a microservice/service that obtains the location estimate of the UE 105. The server 150 may, for example, pull the location estimate from (e.g., by sending a location request to) the UE 105, one or more of the gNBs 110*a*, 110*b* (e.g., via the RU 111, the DU 112, and the CU 113) and/or the ng-eNB 114, and/or the LMF 120. As another example, the UE 105, one or more of the gNBs 110*a*, 110*b* (e.g., via the RU 111, the DU 112, and the CU 113), and/or the LMF 120 may push the location estimate of the UE 105 to the server 150.

The GMLC 125 may support a location request for the UE 105 received from the external client 130 via the server 150 and may forward such a location request to the AMF 115 for forwarding by the AMF 115 to the LMF 120 or may forward the location request directly to the LMF 120. A location response from the LMF 120 (e.g., containing a location estimate for the UE 105) may be returned to the GMLC 125 either directly or via the AMF 115 and the GMLC 125 may then return the location response (e.g., containing the location estimate) to the external client 130 via the server 150. The GMLC 125 is shown connected to both the AMF 115 and LMF 120, though may not be connected to the AMF 115 or the LMF 120 in some implementations.

As further illustrated in FIG. 1, the LMF 120 may communicate with the gNBs 110*a*, 110*b* and/or the ng-eNB 114 using a New Radio Position Protocol A (which may be referred to as NPPa or NRPPa), which may be defined in 3GPP Technical Specification (TS) 38.455. NRPPa may be the same as, similar to, or an extension of the LTE Positioning Protocol A (LPPa) defined in 3GPP TS 36.455, with NRPPa messages being transferred between the gNB 110*a* (or the gNB 110*b*) and the LMF 120, and/or between the ng-eNB 114 and the LMF 120, via the AMF 115. As further illustrated in FIG. 1, the LMF 120 and the UE 105 may communicate using an LTE Positioning Protocol (LPP), which may be defined in 3GPP TS 36.355. The LMF 120 and the UE 105 may also or instead communicate using a New Radio Positioning Protocol (which may be referred to as NPP or NRPP), which may be the same as, similar to, or an extension of LPP. Here, LPP and/or NPP messages may be transferred between the UE 105 and the LMF 120 via the AMF 115 and the serving gNB 110*a*, 110*b* or the serving ng-eNB 114 for the UE 105. For example, LPP and/or NPP messages may be transferred between the LMF 120 and the AMF 115 using a 5G Location Services Application Protocol (LCS AP) and may be transferred between the AMF 115 and the UE 105 using a 5G Non-Access Stratum (NAS) protocol. The LPP and/or NPP protocol may be used to support positioning of the UE 105 using UE-assisted and/or UE-based position methods such as A-GNSS, RTK, OTDOA and/or E-CID. The NRPPa protocol may be used to support positioning of the UE 105 using network-based position methods such as E-CID (e.g., when used with measurements obtained by the gNB 110*a*, 110*b* or the ng-eNB 114) and/or may be used by the LMF 120 to obtain location related information from the gNBs 110*a*, 110*b* and/or the ng-eNB 114, such as parameters defining directional SS or PRS transmissions from the gNBs 110*a*. 110*b*, and/or the ng-eNB 114. The LMF 120 may be co-located or integrated with a gNB or a TRP, or may be disposed remote from the gNB and/or the TRP and configured to communicate directly or indirectly with the gNB and/or the TRP.

With a UE-assisted position method, the UE 105 may obtain location measurements and send the measurements to a location server (e.g., the LMF 120) for computation of a location estimate for the UE 105. For example, the location measurements may include one or more of a Received Signal Strength Indication (RSSI), Round Trip signal propagation Time (RTT), Reference Signal Time Difference (RSTD), Reference Signal Received Power (RSRP) and/or Reference Signal Received Quality (RSRQ) for the gNBs 110*a*, 110*b*, the ng-eNB 114, and/or a WLAN AP. The location measurements may also or instead include measurements of GNSS pseudorange, code phase, and/or carrier phase for the SVs 190-193.

With a UE-based position method, the UE 105 may obtain location measurements (e.g., which may be the same as or similar to location measurements for a UE-assisted position method) and may compute a location of the UE 105 (e.g., with the help of assistance data received from a location server such as the LMF 120 or broadcast by the gNBs 110*a*, 110*b*, the ng-eNB 114, or other base stations or APs).

With a network-based position method, one or more base stations (e.g., the gNBs 110*a*, 110*b*, and/or the ng-eNB 114) or APs may obtain location measurements (e.g., measurements of RSSI, RTT, RSRP, RSRQ or Time of Arrival (ToA) for signals transmitted by the UE 105) and/or may receive measurements obtained by the UE 105. The one or more base stations or APs may send the measurements to a location server (e.g., the LMF 120) for computation of a location estimate for the UE 105.

Information provided by the gNBs 110*a*, 110*b*, and/or the ng-eNB 114 to the LMF 120 using NRPPa may include timing and configuration information for directional SS or PRS transmissions and location coordinates. The LMF 120 may provide some or all of this information to the UE 105 as assistance data in an LPP and/or NPP message via the NG-RAN 135 and the 5GC 140.

An LPP or NPP message sent from the LMF 120 to the UE 105 may instruct the UE 105 to do any of a variety of things depending on desired functionality. For example, the LPP or NPP message could contain an instruction for the UE 105 to obtain measurements for GNSS (or A-GNSS), WLAN, E-CID, and/or OTDOA (or some other position method). In the case of E-CID, the LPP or NPP message may instruct the UE 105 to obtain one or more measurement quantities (e.g., beam ID, beam width, mean angle, RSRP, RSRQ measurements) of directional signals transmitted within particular cells supported by one or more of the gNBs 110*a*, 110*b*, and/or the ng-eNB 114 (or supported by some other type of base station such as an eNB or WiFi AP). The UE 105 may send the measurement quantities back to the LMF 120 in an LPP or NPP message (e.g., inside a 5G NAS message) via the serving gNB 110*a* (or the serving ng-eNB 114) and the AMF 115.

As noted, while the communication system 100 is described in relation to 5G technology, the communication system 100 may be implemented to support other communication technologies, such as GSM, WCDMA, LTE, etc., that are used for supporting and interacting with mobile devices such as the UE 105 (e.g., to implement voice, data, positioning, and other functionalities). In some such embodiments, the 5GC 140 may be configured to control different air interfaces. For example, the 5GC 140 may be connected to a WLAN using a Non-3GPP InterWorking Function (N3IWF, not shown FIG. 1) in the 5GC 140. For example, the WLAN may support IEEE 802.11 WiFi access for the UE 105 and may comprise one or more WiFi APs. Here, the N3IWF may connect to the WLAN and to other elements in the 5GC 140 such as the AMF 115. In some embodiments, both the NG-RAN 135 and the 5GC 140 may be replaced by one or more other RANs and one or more other core networks. For example, in an EPS, the NG-RAN 135 may be replaced by an E-UTRAN containing eNBs and the 5GC 140 may be replaced by an EPC containing a Mobility Management Entity (MME) in place of the AMF 115, an E-SMLC in place of the LMF 120, and a GMLC that may be similar to the GMLC 125. In such an EPS, the E-SMLC may use LPPa in place of NRPPa to send and receive location information to and from the eNBs in the E-UTRAN and may use LPP to support positioning of the UE 105. In these other embodiments, positioning of the UE 105 using directional PRSs may be supported in an analogous manner to that described herein for a 5G network with the difference that functions and procedures described herein for the gNBs 110*a*, 110*b*, the ng-eNB 114, the AMF 115, and the LMF 120 may, in some cases, apply instead to other network elements such eNBs, WiFi APs, an MME, and an E-SMLC.

As noted, in some embodiments, positioning functionality may be implemented, at least in part, using the directional SS or PRS beams, sent by base stations (such as the gNBs 110*a*, 110*b*, and/or the ng-eNB 114) that are within range of the UE whose position is to be determined (e.g., the UE 105 of FIG. 1). The UE may, in some instances, use the directional SS or PRS beams from a plurality of base stations (such as the gNBs 110*a*, 110*b*, the ng-eNB 114, etc.) to compute the position of the UE.

Figure 2:
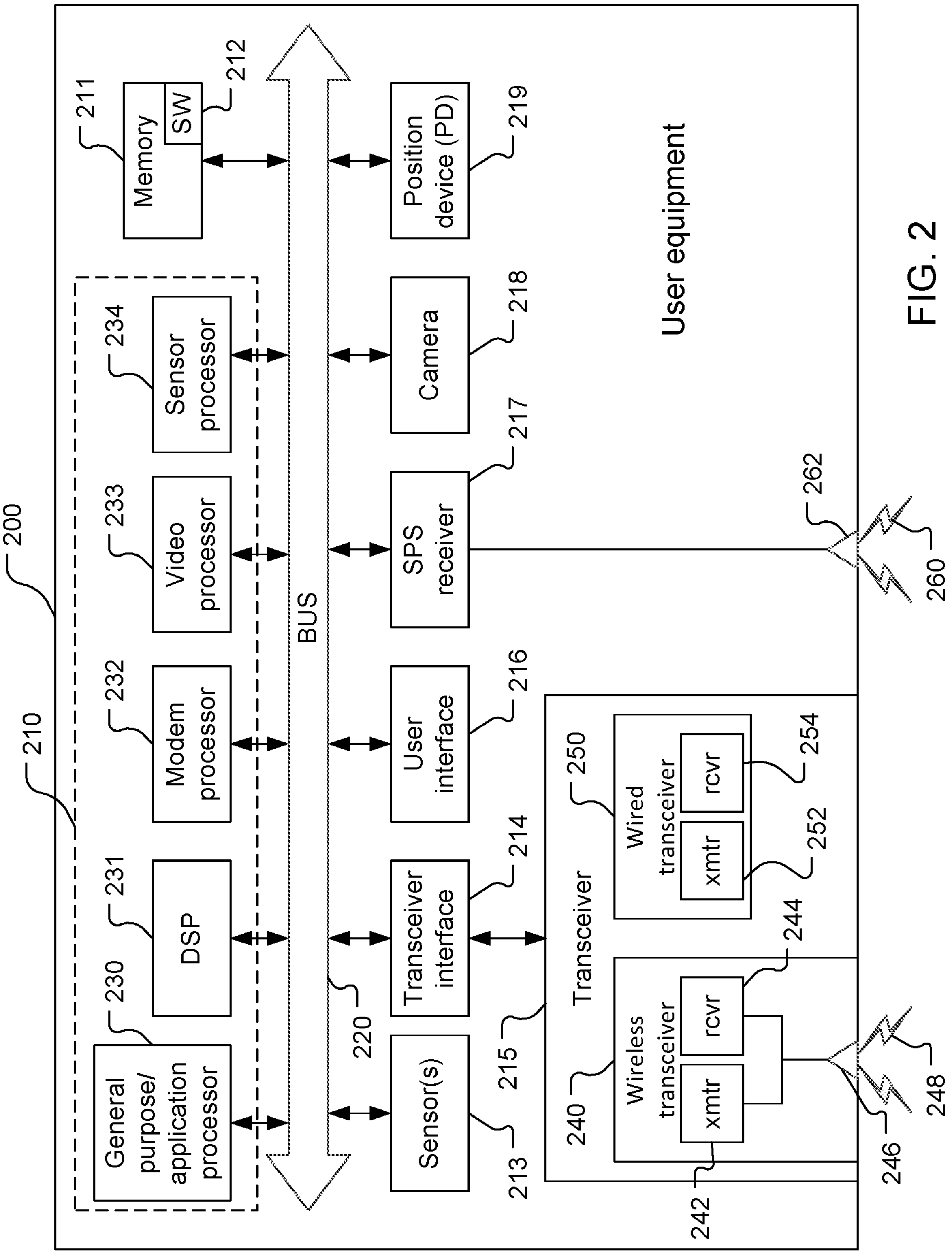
FIG. 2 is a block diagram of components of an example user equipment shown in FIG. 1.

Referring also to FIG. 2, a UE 200 may be an example of one of the UEs 105, 106 and may comprise a computing platform including a processor 210, memory 211 including software (SW) 212, one or more sensors 213, a transceiver interface 214 for a transceiver 215 (that includes a wireless transceiver 240 and a wired transceiver 250), a user interface 216, a Satellite Positioning System (SPS) receiver 217, a camera 218, and a position device (PD) 219. The processor 210, the memory 211, the sensor(s) 213, the transceiver interface 214, the user interface 216, the SPS receiver 217, the camera 218, and the position device 219 may be communicatively coupled to each other by a bus 220 (which may be configured, e.g., for optical and/or electrical communication). One or more of the shown apparatus (e.g., the camera 218, the position device 219, and/or one or more of the sensor(s) 213, etc.) may be omitted from the UE 200. The processor 210 may include one or more intelligent hardware devices, e.g., a central processing unit (CPU), a microcontroller, an application specific integrated circuit (ASIC), etc. The processor 210 may comprise multiple processors including a general-purpose/application processor 230, a Digital Signal Processor (DSP) 231, a modem processor 232, a video processor 233, and/or a sensor processor 234. One or more of the processors 230-234 may comprise multiple devices (e.g., multiple processors). For example, the sensor processor 234 may comprise, e.g., processors for RF (radio frequency) sensing (with one or more (cellular) wireless signals transmitted and reflection(s) used to identify, map, and/or track an object), and/or ultrasound, etc. The modem processor 232 may support dual SIM/dual connectivity (or even more SIMs). For example, a SIM (Subscriber Identity Module or Subscriber Identification Module) may be used by an Original Equipment Manufacturer (OEM), and another SIM may be used by an end user of the UE 200 for connectivity. The memory 211 may be a non-transitory storage medium that may include random access memory (RAM), flash memory, disc memory, and/or read-only memory (ROM), etc. The memory 211 may store the software 212 which may be processor-readable, processor-executable software code containing instructions that may be configured to, when executed, cause the processor 210 to perform various functions described herein. Alternatively, the software 212 may not be directly executable by the processor 210 but may be configured to cause the processor 210, e.g., when compiled and executed, to perform the functions. The description herein may refer to the processor 210 performing a function, but this includes other implementations such as where the processor 210 executes software and/or firmware. The description herein may refer to the processor 210 performing a function as shorthand for one or more of the processors 230-234 performing the function. The description herein may refer to the UE 200 performing a function as shorthand for one or more appropriate components of the UE 200 performing the function. The processor 210 may include a memory with stored instructions in addition to and/or instead of the memory 211. Functionality of the processor 210 is discussed more fully below.

The configuration of the UE 200 shown in FIG. 2 is an example and not limiting of the disclosure, including the claims, and other configurations may be used. For example, an example configuration of the UE may include one or more of the processors 230-234 of the processor 210, the memory 211, and the wireless transceiver 240. Other example configurations may include one or more of the processors 230-234 of the processor 210, the memory 211, a wireless transceiver, and one or more of the sensor(s) 213, the user interface 216, the SPS receiver 217, the camera 218, the PD 219, and/or a wired transceiver.

The UE 200 may comprise the modem processor 232 that may be capable of performing baseband processing of signals received and down-converted by the transceiver 215 and/or the SPS receiver 217. The modem processor 232 may perform baseband processing of signals to be upconverted for transmission by the transceiver 215. Also or alternatively, baseband processing may be performed by the general-purpose/application processor 230 and/or the DSP 231. Other configurations, however, may be used to perform baseband processing.

The transceiver 215 may include a wireless transceiver 240 and a wired transceiver 250 configured to communicate with other devices through wireless connections and wired connections, respectively. For example, the wireless transceiver 240 may include a wireless transmitter 242 and a wireless receiver 244 coupled to an antenna 246 for transmitting (e.g., on one or more uplink channels and/or one or more sidelink channels) and/or receiving (e.g., on one or more downlink channels and/or one or more sidelink channels) wireless signals 248 and transducing signals from the wireless signals 248 to wired (e.g., electrical and/or optical) signals and from wired (e.g., electrical and/or optical) signals to the wireless signals 248. The wireless transmitter 242 includes appropriate components (e.g., a power amplifier and a digital-to-analog converter). The wireless receiver 244 includes appropriate components (e.g., one or more amplifiers, one or more frequency filters, and an analog-to-digital converter). The wireless transmitter 242 may include multiple transmitters that may be discrete components or combined/integrated components, and/or the wireless receiver 244 may include multiple receivers that may be discrete components or combined/integrated components. The wireless transceiver 240 may be configured to communicate signals (e.g., with TRPs and/or one or more other devices) according to a variety of radio access technologies (RATs) such as 5G New Radio (NR), GSM (Global System for Mobiles), UMTS (Universal Mobile Telecommunications System), AMPS (Advanced Mobile Phone System), CDMA (Code Division Multiple Access), WCDMA (Wideband CDMA), LTE (Long Term Evolution), LTE Direct (LTE-D), 3GPP LTE-V2X (PC5), IEEE 802.11 (including IEEE 802.11p), WiFi, WiFi Direct (WiFi-D), Bluetooth®, Zigbee etc. New Radio may use mm-wave frequencies and/or sub-6 GHZ frequencies. The wired transceiver 250 may include a wired transmitter 252 and a wired receiver 254 configured for wired communication, e.g., a network interface that may be utilized to communicate with the NG-RAN 135 to send communications to, and receive communications from, the NG-RAN 135. The wired transmitter 252 may include multiple transmitters that may be discrete components or combined/integrated components, and/or the wired receiver 254 may include multiple receivers that may be discrete components or combined/integrated components. The wired transceiver 250 may be configured, e.g., for optical communication and/or electrical communication. The transceiver 215 may be communicatively coupled to the transceiver interface 214, e.g., by optical and/or electrical connection. The transceiver interface 214 may be at least partially integrated with the transceiver 215. The wireless transmitter 242, the wireless receiver 244, and/or the antenna 246 may include multiple transmitters, multiple receivers, and/or multiple antennas, respectively, for sending and/or receiving, respectively, appropriate signals.

The SPS receiver 217 (e.g., a Global Positioning System (GPS) receiver) may be capable of receiving and acquiring SPS signals 260 via an SPS antenna 262. The SPS antenna 262 is configured to transduce the SPS signals 260 from wireless signals to wired signals, e.g., electrical or optical signals, and may be integrated with the antenna 246. The SPS receiver 217 may be configured to process, in whole or in part, the acquired SPS signals 260 for estimating a location of the UE 200. For example, the SPS receiver 217 may be configured to determine location of the UE 200 by trilateration using the SPS signals 260. The general-purpose/application processor 230, the memory 211, the DSP 231 and/or one or more specialized processors (not shown) may be utilized to process acquired SPS signals, in whole or in part, and/or to calculate an estimated location of the UE 200, in conjunction with the SPS receiver 217. The memory 211 may store indications (e.g., measurements) of the SPS signals 260 and/or other signals (e.g., signals acquired from the wireless transceiver 240) for use in performing positioning operations. The general-purpose/application processor 230, the DSP 231, and/or one or more specialized processors, and/or the memory 211 may provide or support a location engine for use in processing measurements to estimate a location of the UE 200.

The position device (PD) 219 may be configured to determine a position of the UE 200, motion of the UE 200, and/or relative position of the UE 200, and/or time. For example, the PD 219 may communicate with, and/or include some or all of, the SPS receiver 217. The PD 219 may work in conjunction with the processor 210 and the memory 211 as appropriate to perform at least a portion of one or more positioning methods, although the description herein may refer to the PD 219 being configured to perform, or performing, in accordance with the positioning method(s). The PD 219 may also or alternatively be configured to determine location of the UE 200 using terrestrial-based signals (e.g., at least some of the wireless signals 248) for trilateration, for assistance with obtaining and using the SPS signals 260, or both. The PD 219 may be configured to determine location of the UE 200 based on a cell of a serving base station (e.g., a cell center) and/or another technique such as E-CID. The PD 219 may be configured to use one or more images from the camera 218 and image recognition combined with known locations of landmarks (e.g., natural landmarks such as mountains and/or artificial landmarks such as buildings, bridges, streets, etc.) to determine location of the UE 200. The PD 219 may be configured to use one or more other techniques (e.g., relying on the UE's self-reported location (e.g., part of the UE's position beacon)) for determining the location of the UE 200, and may use a combination of techniques (e.g., SPS and terrestrial positioning signals) to determine the location of the UE 200. The PD 219 may include one or more of the sensors 213 (e.g., gyroscope(s), accelerometer(s), magnetometer(s), etc.) that may sense orientation and/or motion of the UE 200 and provide indications thereof that the processor 210 (e.g., the general-purpose/application processor 230 and/or the DSP 231) may be configured to use to determine motion (e.g., a velocity vector and/or an acceleration vector) of the UE 200. The PD 219 may be configured to provide indications of uncertainty and/or error in the determined position and/or motion.

Functionality of the PD 219 may be provided in a variety of manners and/or configurations, e.g., by the general-purpose/application processor 230, the transceiver 215, the SPS receiver 217, and/or another component of the UE 200, and may be provided by hardware, software, firmware, or various combinations thereof.

For terrestrial positioning of a UE in cellular networks, techniques such as Advanced Forward Link Trilateration (AFLT) and Observed Time Difference Of Arrival (OTDOA) often operate in "UE-assisted" mode in which measurements of reference signals (e.g., PRS, CRS, etc.) transmitted by base stations are taken by the UE and then provided to a location server. The location server then calculates the position of the UE based on the measurements and known locations of the base stations. Because these techniques use the location server to calculate the position of the UE, rather than the UE itself, these positioning techniques are not frequently used in applications such as car or cell-phone navigation, which instead typically rely on satellite-based positioning.

An apparatus such as a UE may use a Satellite Positioning System (SPS) (a Global Navigation Satellite System (GNSS)) for high-accuracy positioning using precise point positioning (PPP) or real time kinematic (RTK) technology. These technologies use assistance data such as measurements from ground-based stations. LTE Release 15 allows the data to be encrypted so that the UEs subscribed to the service exclusively can read the information. Such assistance data varies with time. Thus, a UE subscribed to the service may not easily "break encryption" for other UEs by passing on the data to other UEs that have not paid for the subscription. The passing on would need to be repeated every time the assistance data changes.

Figure 3:
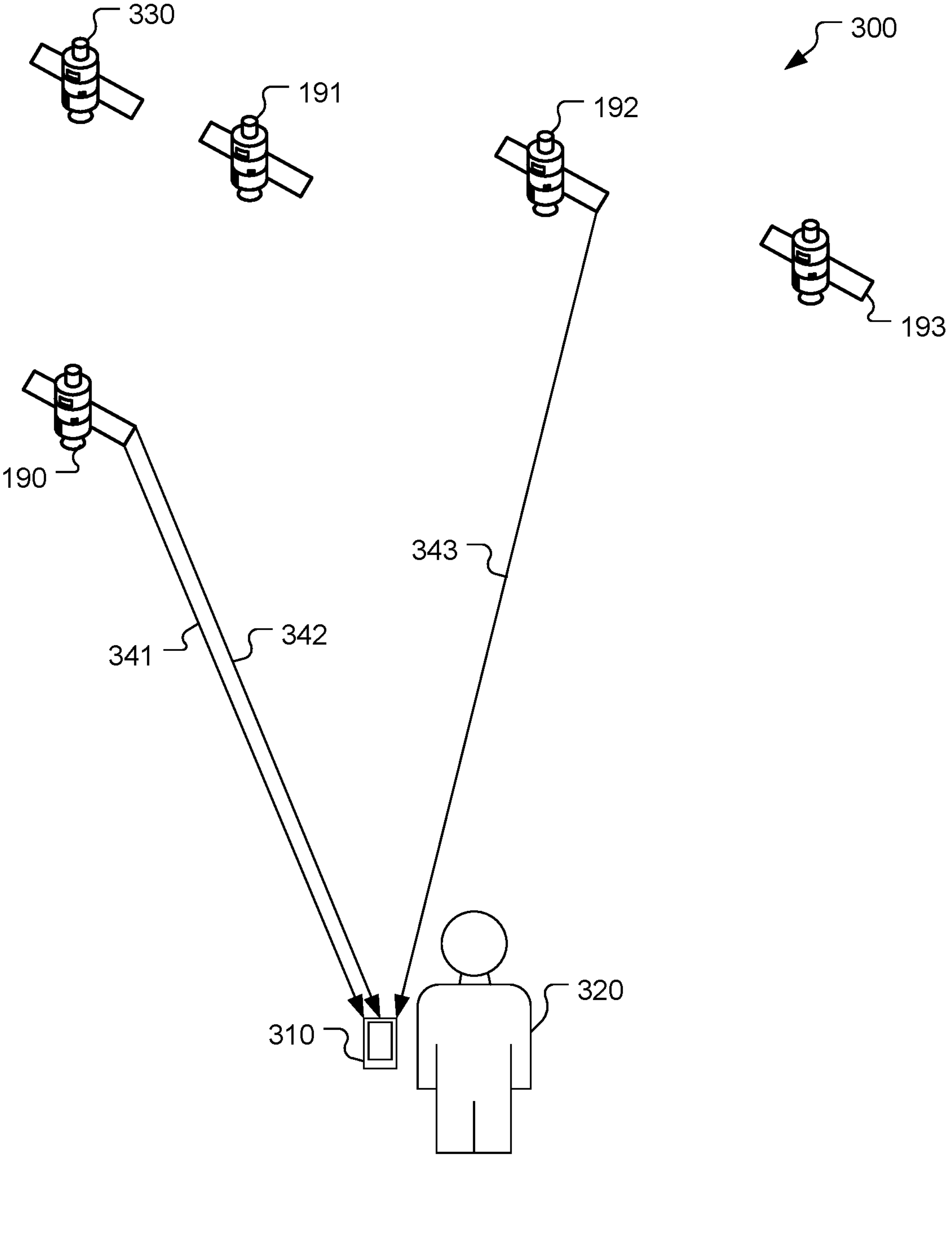
FIG. 3 is a simplified diagram of a navigation environment.

Referring also to FIG. 3, in a navigation environment 300, a UE 310 associated with (e.g., held by) a user 320 may receive satellite signals from the satellites 190-193 and one or more other satellites such as a satellite 330. The satellites 190-193 are members of a satellite constellation, i.e., a group of satellites that are part of a system, e.g., controlled by a common entity such as a government, and orbiting in complementary orbits to facilitate determining positions of entities around the world. The satellite 330 is a member of a different constellation than the constellation of which the satellites 190-193 are members. The satellites 190-193 may be, for example, members of the GPS, Galileo, Beidou, GLONASS, or QZSS constellation. The satellites 190-193 may each transmit multiple satellite signals in different frequency bands, e.g., the satellite 190 may transmit a satellite signal 341 and a satellite signal 342 that have frequencies in different frequency bands, e.g., L1 and L2/L5 frequency bands, the satellites 191 and 193 may transmit signals in the same frequency bands (not shown), and a satellite signal 343 from the satellite 192 may have a frequency in only one frequency band, e.g., the L1 frequency band.

Figure 4:
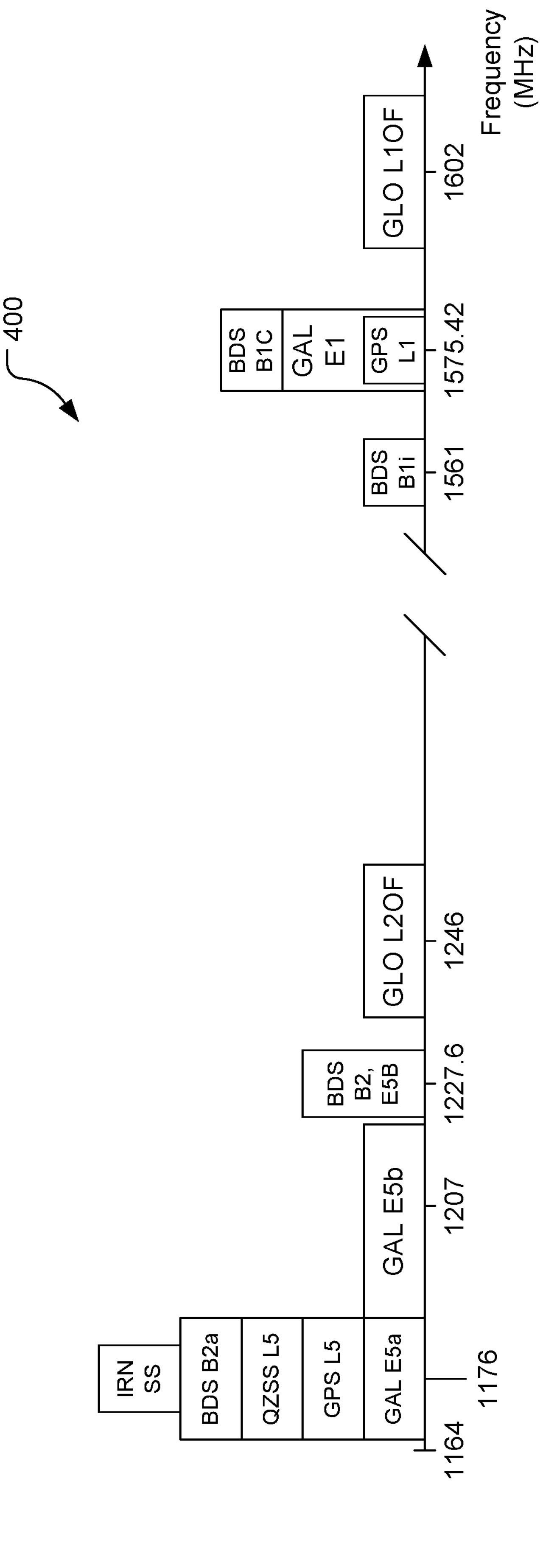
FIG. 4 is a frequency band plot of satellite signals and frequencies of the satellite signals.

Referring also to FIG. 4 (which, like other figures, is not shown to scale), a frequency band plot 400 shows that GNSS constellations operate on several frequencies in the L-Band. The L1 frequency band typically covers frequencies from 1559 MHz to 1606 MHZ and includes L1 signals from GPS, Galileo, Beidou, GLONASS, and QZSS GNSS constellations. These same constellations also transmit concurrently using another frequency in the L2 frequency band and/or the L5 frequency band. The L2 and L5 signals may complement the L1 signals, which have been used for many years. For example, the L5 signals have wider signal bandwidth than the L1 signals, which helps improve positioning performance in multi-path environments. Also, using the L5 signals in addition to the L1 signals provides frequency diversity. The L2 and L5 signals are far enough away in frequency from the L1 signals that different processing paths may be used to measure the L2 and L5 signals versus the L1 signals. While the discussion herein focuses on the L1, L2, and L5 bands, the discussion (including the claims) are not limited to these bands, nor is the discussion limited to the use of satellite signals in two or three bands.

Multiple satellite bands are allocated to satellite usage. These bands include the L-band, used for GNSS satellite communications, the C-band, used for communications satellites such as television broadcast satellites, the X-band, used by the military and for RADAR applications, and the Ku-band (primarily downlink communication and the Ka-band (primarily uplink communications), the Ku and Ka bands used for communications satellites. The L-band is defined by IEEE as the frequency range from 1 to 2 GHZ. The L-Band is utilized by the GNSS satellite constellations such as GPS, Galileo, GLONASS, and BeiDou, and is broken into five bands, the L1 Band: 1575.42 MHZ, L2: 1227.60 MHZ, L3 Band: 1381.05 MHz, L5 Band: 1176.45 MHz. For location purposes, the L1 band has historically been used by commercial GNSS receivers. However, measuring GNSS signals across more than one band may provide for improved accuracy and availability.

Highly accurate estimation of a position of a UE is often desirable. Various techniques may be used to provide highly-accurate position estimates. For example, PPP and/or RTK may be used to determine centimeter-level position estimates. In order to achieve such accuracies, precise receiver clock estimations are determined. Multiple SV signals are received and measured and each SV signal has a corresponding receiver clock term. Base correction may be used to remove multiple error sources including satellite clock error. Satellite vehicles have very precise clock and stay biased with respect to each other by fixed amounts that can be obtained such that once one clock term is determined, the clock terms for other SVs may be determined.

SPS receiver clock estimates may be obtained using various techniques/models. For example, in an SPS receiver clock modeling method, a primary signal (e.g., GPS L1 C/A) is selected to map to a primary receiver clock term. Other signals may be mapped to the primary receiver clock term and an ISTB (Inter/Intra System/Signal Time Bias). As another example, a precise positioning engine (PPE) and/or RTK engine may be used to determine precise receiver clock estimations. A reference SV may be selected and a differential between SVs determined to remove a receiver clock term from consideration. A PPE may estimate a receiver clock with or without double-differencing.

One or more of various challenges may inhibit receiver clock estimation. For example, SPS signal availability may be dynamic. One or more signal bands may be blocked, e.g., due to jamming. When a primary signal (e.g., GPS L1 C/A) is not available or is swapped for another signal, an exception to PPE receiver clock estimation may occur. Techniques are discussed herein to provide receiver clock estimation absent the availability of a primary signal. Techniques discussed herein may smoothly handle signal drop scenarios with the PPE estimation of a receiver clock.

Figure 5:
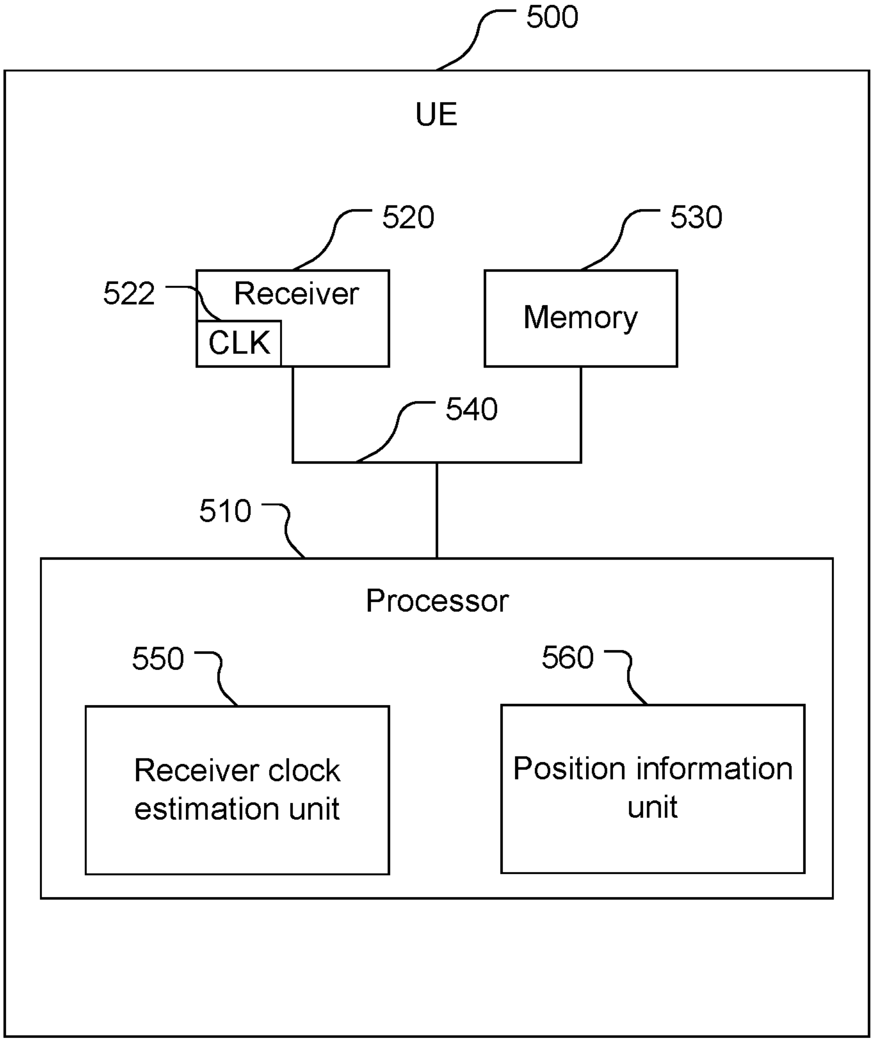
FIG. 5 is a block diagram of an example user equipment.

Referring to FIG. 5, with further reference to FIGS. 1-4, a UE 500 includes a processor 510, a receiver 520, and a memory 530 communicatively coupled to each other by a bus 540. The UE 500 may include some or all of the components shown in FIG. 5, and may include one or more other components such as any of those shown in FIG. 2 such that the UE 200 may be an example of the UE 500. The processor 510 may include one or more components of the processor 210. The receiver 520 may include one or more of the components of the transceiver 215, e.g., the wireless transmitter 242 and the antenna 246, or the wireless receiver 244 and the antenna 246, or the wireless transmitter 242, the wireless receiver 244, and the antenna 246. Also or alternatively, the receiver 520 may include the wired transmitter 252 and/or the wired receiver 254. The receiver 520 may include the SPS receiver 217 and the antenna 262. The memory 530 may be configured similarly to the memory 211, e.g., including software with processor-readable instructions configured to cause the processor 510 to perform functions.

The description herein may refer only to the processor 510 performing a function, but this includes other implementations such as where the processor 510 executes software (stored in the memory 530) and/or firmware. The description herein may refer to the UE 500 performing a function as shorthand for one or more appropriate components (e.g., the processor 510 and the memory 530) of the UE 500 performing the function. The processor 510 (possibly in conjunction with the memory 530 and, as appropriate, the receiver 520) includes a receiver clock estimation unit 550 and a position information unit 560. The receiver clock estimation unit 550 may be configured to perform one or more functions to estimate receiver clocks corresponding to different SV signals. The position information unit 560 may be configured to use receiver clock estimates to determine position information such as one or more ranges, one or more pseudoranges, one or more carrier phases, one or more location estimates, one or more speeds, one or more velocities, etc. The receiver clock estimation unit 550 and the position information unit 560 are discussed further below, and the description may refer to the processor 510 generally, or the UE 500 generally, as performing any of the functions of the receiver clock estimation unit 550 and/or the position information unit 560, with the UE 500 being configured to perform the function(s). While the discussion herein focuses on the UE 500, functions discussed as being performed by the UE 500 may also or alternatively be performed by another apparatus (e.g., a base station).

An apparatus such as a UE or base station may obtain un-differenced measurements (measurements base on an SV signal without determining differences between the measurements of the signal by the apparatus and measurements of the same signal by another apparatus). For example, GPS un-differenced measurements may be described by Equations (1)-(4) below.

$$P_{Li} = \rho + dT + \delta Orb + \delta Clk + ISTB_{Li} + dTrop + \frac{f_1^2 * dIono}{f_i^2} + \epsilon_{P_{Li}} \quad (1)$$

$$\Phi_{Li} = \rho + dT + \delta Orb + \delta Clk + ISTB_{Li} + dTrop - \frac{f_1^2 * dIono}{f_i^2} + \lambda_{Li}(N_{Li} + r_{Li} - s_{Li}) + \epsilon_{\Phi_{Li}} \quad (2)$$

-continued $$P_{Lj} = \rho + dT + \delta Orb + \delta Clk + ISTB_{Lj} + dTrop + \frac{f_1^2 * dIono}{f_j^2} + \epsilon_{P_{Lj}} \quad (3)$$

$$\Phi_{Lj} = \rho + dT + \delta Orb + \delta Clk + ISTB + dTrop - \frac{f_1^2 * dIono}{f_j^2} + \lambda_{Lj}(N_{Lj} + r_{Lj} - s_{Lj}) + \epsilon_{\Phi_{Lj}} \quad (4)$$

where $P_{Li}$ is a pseudorange measurement (in meters (m)) based on an Li frequency band (e.g., L1 band or L5 band) signal, $\Phi_{Li}$ is a carrier phase measurement (m) based on the Li signal, ρ is a geometry range (m), dT is a receiver clock term based on a user-selected primary signal band (m), δOrb is a satellite orbit error (m), δClk is a satellite clock error (m), ISTB represents inter/intra system/signal time biases (m), dTrop is a troposphere delay residual error after applying the model on the L1 band, dIono is ionosphere delay residual error after applying the model on the L1 band, $f_1$ is a frequency (in Hz) of the L1 band, $f_2$ is a frequency in the L2 band, N is an ambiguity integer term (cycles), r is an ambiguity receiver fractional bias term (cycles), s is an ambiguity satellite fractional bias term (cycles), and e is a noise and multipath term (m). The receiver clock term dT is a is a clock bias of a clock 522 of the receiver 520 of the UE 500 relative to an SV clock (e.g., relative to GNSS system time). Because the dIono is the ionospheric delay on the L1 band, the coefficient $$\frac{f_1^2}{f_i^2}$$

is used to map the delay from dIono to the L2 band. GAL (Galileo) un-differenced measurements may be described by equations similar to Equations (1)-(4).

The central frequency information for different SPS constellations including GPS, GALILEO, and BDS are provided in Table 1, where the value of $f_0$ is 10.23 MHz.

| SPS frequency ID | GPS | GAL | BDS |
|---|---|---|---|
| SPS-L1 | L1 (154 * $f_0$) | E1 (154 * $f_0$) | B1 (152.6 * $f_0$) |
| SPS-L2 | L2 (120 * $f_0$) | E6 (125 * $f_0$) | B3 (124 * $f_0$) |
| SPS-L5 | L5 (115 * $f_0$) | E5A (115 * $f_0$) | B2A (115 * $f_0$) |

Receiver-receiver single differences (RRSD) (applying base correction) may be determined. The between-receiver single differences are determined by taking the difference of measurements of the same signal received by different receivers (e.g., a UE and a base station) or a difference of measurements by the same receiver of different SV signals. By applying base correction, some SV error terms (e.g., Iono and Tropo) may be removed. After receiver-receiver single differencing (applying base correction), the satellite orbit, clock, troposphere error, ionosphere error, and ambiguity satellite fractional bias are canceled out, and the GPS measurements may be expressed by Equations (5)-(8) below.

$$\Delta P_{Li} = \Delta\rho + (\Delta dT + \Delta ISTB_{Li}) + \epsilon_{\Delta P_{Li}} \quad (5)$$

$$\Delta\Phi_{Li} = \Delta\rho + (\Delta dT + \Delta ISTB_{Li}) + \lambda_{Li}(\Delta N_{Li} + \Delta r_{Li}) + \epsilon_{\Delta\Phi_{Li}} \quad (6)$$

-continued $$\Delta P_{Lj} = \Delta\rho + (\Delta dT + \Delta ISTB_{Lj}) + \epsilon_{\Delta P_{Lj5}} \quad (7)$$

$$\Delta\Phi_{Lj} = \Delta\rho + (\Delta dT + \Delta ISTB_{Lj}) + \lambda_{Lj}(\Delta N_{Lj} + \Delta r_{Lj}) + \epsilon_{\Delta\Phi_{Lj}} \quad (8)$$

where Δ is the RRSD operator, and ΔdT is RRSD receiver clock bias. Similarly, the GAL measurements with between-receiver single differencing may be expressed by equations similar to Equations (5)-(8) below.

Historically, in receiver clock estimation, a primary signal is selected and the ISTB values of other bands are estimated relative to the primary signal. For example, if GPS Li is selected as a primary signal for receiver clock estimation, then the effective receiver clock terms for frequency bands Li and Lj become $$\Delta dT_{Li} = \Delta dT + \Delta ISTB_{Li} \quad (9)$$

$$\Delta dT_{Lj} = \Delta dT_{Li} + (\Delta ISTB_{Lj} - \Delta ISTB_{Li}) \quad (10)$$

and an measurement update model, e.g., an EKF (Extended Kalman Filter) measurement model update may be expressed as $$\begin{bmatrix} \Delta P_{Li} - \Delta\rho \\ \Delta\Phi_{Li} - \Delta\rho - \lambda_{Li}(\Delta N_{Li} + \Delta r_{Li}) \\ \Delta P_{Lj} - \Delta\rho \\ \Delta\Phi_{Lj} - \Delta\rho - \lambda_{Lj}(\Delta N_{Lj} + r_{Lj}) \end{bmatrix} = \begin{bmatrix} 1 & 0 \\ 1 & 0 \\ 1 & 1 \\ 1 & 1 \end{bmatrix} * \begin{bmatrix} \Delta dT_{Li} \\ (\Delta ISTB_{Lj} - \Delta ISTB_{Li}) \end{bmatrix} \quad (11)$$

If the primary signal becomes unavailable, a PPE estimation exception may occur without receiver clock swapping logic being applied.

The above is an example, and receiver clock estimation with RRSD measurement may be performed in other ways. For example, effective receiver clock terms are different at different frequency bands and may be represented as:

$$\Delta dT_{Li} = \Delta dT + \Delta ISTB_{Li} \quad (12)$$

$$\Delta dT_{Lj} = \Delta dT + \Delta ISTB_{Lj} \quad (13)$$

In this case, the SPS RRSD measurements may be re-written as:

$$\Delta P_{Li} = \Delta\rho + \Delta dT_{Li} + \epsilon_{\Delta P_{Li}} \quad (14)$$

$$\Delta\Phi_{Li} = \Delta\rho + \Delta dT_{Li} + \lambda_{Li}(\Delta N_{Li} + \Delta r_{Li}) + \epsilon_{\Delta\Phi_{Li}} \quad (15)$$

$$\Delta P_{Lj} = \Delta\rho + \Delta dT_{Lj} + \epsilon_{\Delta P_{Lj}} \quad (16)$$

$$\Delta\Phi_{Lj} = \Delta\rho + \Delta dT_{Lj} + \lambda_{Lj}(\Delta N_{Lj} + r_{Lj}) + \epsilon_{\Delta\Phi_{Lj}} \quad (17)$$

Considering only the receiver clock estimation, the EKF estimated state may be given by $$EKF \text{ state} = \begin{bmatrix} \Delta dT_{Li} \\ \Delta dT_{Lj} \end{bmatrix} \quad (18)$$

and the EKF measurement model update may be given by $$\begin{bmatrix} \Delta P_{Li}-\Delta\rho \\ \Delta\Phi_{Li}-\Delta\rho-\lambda_{Li}(\Delta N_{Li}+\Delta r_{Li}) \\ \Delta P_{Lj}-\Delta\rho \\ \Delta\Phi_{Lj}-\Delta\rho-\lambda_{Lj}(\Delta N_{Lj}+r_{Lj}) \end{bmatrix} = \begin{bmatrix} 1 & 0 \\ 1 & 0 \\ 0 & 1 \\ 0 & 1 \end{bmatrix} * \begin{bmatrix} \Delta dT_{Li} \\ \Delta dT_{Lj} \end{bmatrix} \tag{19}$$

By using this alternative model, a position estimation can be performed after the primary signal becomes unavailable. If, however, high-precision time synchronization within a regional network is based on a primary signal band, e.g., the Li band, when the primary signal band becomes unavailable for a device, then the primary signal band receiver clock term $\Delta dT_{Li}$ becomes unavailable, and the device will be unable to continue to participate in the time synchronization.

The UE 500, e.g., the receiver clock estimation unit 550, may be configured to determine receiver clock estimations absent a primary signal using techniques unlike previous devices or systems. For example, based on the fact that the delta change value over time is the same for the receiver clock, a common clock rate term may be introduced in the filter, e.g., the EKF, in response to loss of a primary signal (e.g., non-reception of the reference signal, inability to accurately measure the reference signal, jamming on a specific frequency band, etc.). The receiver clock estimation unit 550 may introduce a clock drift term, $\Delta d\dot{T}$, corresponding to clock drift of a signal source (e.g., SV) of the primary signal that has been lost. An initial value of the clock drift term, $\Delta d\dot{T}$, may be determined using DCP updating based on one or more available positioning signals, e.g., as discussed below with respect to Equation (29). The receiver clock estimation unit 550 may determine an updated value of the clock drift, and updated changes in receiver clock biases corresponding to different SV signals by recursive computation estimation, e.g., by a filter time update such as an Enhanced Kalman Filter (EKF) time update for the clock-related state according to Equation (20)

$$\begin{bmatrix} \Delta dT_{Li} \\ \Delta dT_{Lj} \\ \Delta d\dot{T} \end{bmatrix}_{t_{n+1}} = \begin{bmatrix} 1 & 0 & \delta t \\ 0 & 1 & \delta t \\ 0 & 0 & 1 \end{bmatrix} * \begin{bmatrix} \Delta dT_{Li} \\ \Delta dT_{Lj} \\ \Delta d\dot{T} \end{bmatrix}_{t_n} \tag{20}$$

$$\text{where } \delta t = t_{n+1} - t_n \tag{21}$$

where δt is a device measurement time interval between the $n^{th}$ epoch and the $n+1^{th}$ epoch. The clock drift $\Delta d\dot{T}$, also called a common clock rate, is the drift from one measurement epoch to the next measurement epoch (i.e., between consecutive measurement epochs) and is common across different SVs and different signal bands.

The UE 500, e.g., the position information unit 560, may be configured to perform RRSD DCP measurement of the common clock rate. The position information unit 560 may implement DCP measurement, which may be called DCP updating, to determine a change in carrier phase between two (e.g., consecutive) measurements of a satellite signal. By determining the change in carrier phase between measurements, errors in carrier phase due to error sources (e.g., atmospheric delay) in the multiple measurements may cancel such that common error components may be eliminated (or nearly so). For example, the position information unit 560 may determine RRSD CP (Carrier Phase) measurements at times $t_n$ and $t_{n+1}$ as follows:

$$\Delta\Phi_{Li,t_n} = \Delta\rho_{t_n} + \Delta dT_{Li,t_n} + \lambda_{Li}(\Delta N_{Li} + \Delta r_{Li}) + \epsilon_{\Delta\Phi_{Li}} \tag{22}$$

$$\Delta\Phi_{Li,t_{n+1}} = \Delta\rho_{t_{n+1}} + \Delta dT_{Li,t_{n+1}} + \lambda_{Li}(\Delta N_{Li} + \Delta r_{Li}) + \epsilon_{\Delta\Phi_{Li}} \tag{23}$$

$$\Delta\Phi_{Lj,t_n} = \Delta\rho_{t_n} + \Delta dT_{Lj,t_n} + \lambda_{Lj}(\Delta N_{Lj} + r_{Lj}) + \epsilon_{\Delta\Phi_{Lj}} \tag{24}$$

$$\Delta\Phi_{Lj,t_{n+1}} = \Delta\rho_{t_{n+1}} + \Delta dT_{Lj,t_{n+1}} + \lambda_{Lj}(\Delta N_{Lj} + r_{Lj}) + \epsilon_{\Delta\Phi_{Lj}} \tag{25}$$

Using Equations (22)-(25), the position information unit 560 may determine RRSD DCP measurements between $t_n$ and $t_{n+1}$ as follows $$\Delta DCP_{Li,t_{n+1}} = \tag{26}$$

$$\Delta\Phi_{Li,t_{n+1}} - \Delta\Phi_{Li,t_n} = \left(\Delta\rho_{t_{n+1}} - \Delta\rho_{t_n}\right) + \left(\Delta dT_{Li,t_{n+1}} - \Delta dT_{Li,t_n}\right) + \epsilon_{\Delta DCP_{Li}}$$

$$\Delta DCP_{Lj,t_{n+1}} = \tag{27}$$

$$\Delta\Phi_{Lj,t_{n+1}} - \Delta\Phi_{Lj,t_n} = \left(\Delta\rho_{t_{n+1}} - \Delta\rho_{t_n}\right) + \left(\Delta dT_{Lj,t_{n+1}} - \Delta dT_{Lj,t_n}\right) + \epsilon_{\Delta DCP_{Li}}$$

Due to the fact that $$\Delta d\dot{T} * \delta t == \left(\Delta dT_{Li,t_{n+1}} - \Delta dT_{Li,t_n}\right) == \left(\Delta dT_{Lj,t_{n+1}} - \Delta dT_{Lj,t_n}\right) \tag{28}$$

the clock drift $\Delta d\dot{T}$ may be measured by the position information unit 560 using RRSD DCP measurements according to $$\begin{bmatrix} \Delta DCP_{Li,t_{n+1}} - \left(\Delta\rho_{t_{n+1}} - \Delta\rho_{t_n}\right) \\ \Delta DCP_{Lj,t_{n+1}} - \left(\Delta\rho_{t_{n+1}} - \Delta\rho_{t_n}\right) \end{bmatrix} = \begin{bmatrix} \delta t \\ \delta t \end{bmatrix} * \Delta d\dot{T} \tag{29}$$

If the clock estimate for the primary signal is available at time $t_n$ and the primary signal is unavailable at time $t_{n+1}$, then traditionally the clock estimate for the primary signal at time $t_{n+1}$ would also be unavailable. By introducing the clock rate term in the time update model of Equation (28), however, the clock rate term for the primary signal Li can be indicated (e.g., to the EKF) to be the same as for the non-primary signal Lj. Thus, at time $t_{n+1}$ the non-primary signal Lj still has a valid DCP measurement, and therefore the clock rate for the non-primary signal Lj (and also the primary signal Li) may be determined very accurately. Consequently, in the EKF, by combining the precisely-determined clock rate and the clock estimate for the primary signal at time $t_n$, a clock estimate for the primary signal at time $t_{n+1}$ may be determined. This process may be repeated for further times (e.g., time $t_{n+2}$ etc.).

The UE 500, e.g., the position information unit 560, may be configured to use the clock drift term (receiver clock estimation) determined from Equation (29) to determine position information absent the primary signal. For example, the position information unit 560 may determine single-difference pseudorange and carrier phase values according to Equation (30), which is a measurement update equation, in particular an EKF measurement update model.

$$\begin{bmatrix} \Delta P_{Li} - \Delta\rho \\ \Delta\Phi_{Li} - \Delta\rho - \lambda_{Li}(\Delta N_{Li} + \Delta r_{Li}) \\ \Delta P_{Lj} - \Delta\rho \\ \Delta\Phi_{Lj} - \Delta\rho - \lambda_{Lj}(\Delta N_{Lj} + r_{Lj}) \\ \Delta DCP_{Li,t_{n+1}} - \left(\Delta\rho_{t_{n+1}} - \Delta\rho_{t_n}\right) \\ \Delta DCP_{Lj,t_{n+1}} - \left(\Delta\rho_{t_{n+1}} - \Delta\rho_{t_n}\right) \end{bmatrix} = \begin{bmatrix} 1 & 0 & 0 \\ 1 & 0 & 0 \\ 0 & 1 & 0 \\ 0 & 1 & 0 \\ 0 & 0 & \delta t \\ 0 & 0 & \delta t \end{bmatrix} * \begin{bmatrix} \Delta dT_{Li} \\ \Delta dT_{Lj} \\ \Delta d\dot{T} \end{bmatrix} \quad (30)$$

By introducing and using the clock drift term $\Delta d\dot{T}$, better clock estimation accuracy and better outlier detection performance may be achieved due to using a precisely measured clock rate dynamic rather than an empirical model in the absence of a primary signal. Outlier pseudo-range measurements, e.g., due to multipath, may be detected due to the accurate determination of clock terms using the non-primary signal in the absence of availability of the primary signal. By introducing and using the clock drift $\Delta d\dot{T}$ term, the receiver clock estimation unit 550 may continue to output a clock estimate term for a suddenly-unavailable signal band, e.g., when Li becomes unavailable. By using the model of Equation (30), $\Delta dT_{Li}$ can be estimated driven by the time update model of Equation (20) and measured clock rate by RRSD DCP measurement according to Equation (29). While Equation (29) shows the DCP for the primary and non-primary signals Li, Lj, if measurement of a band is lost, then the clock rate may still be updated using the DCP from another band.

Figure 6:
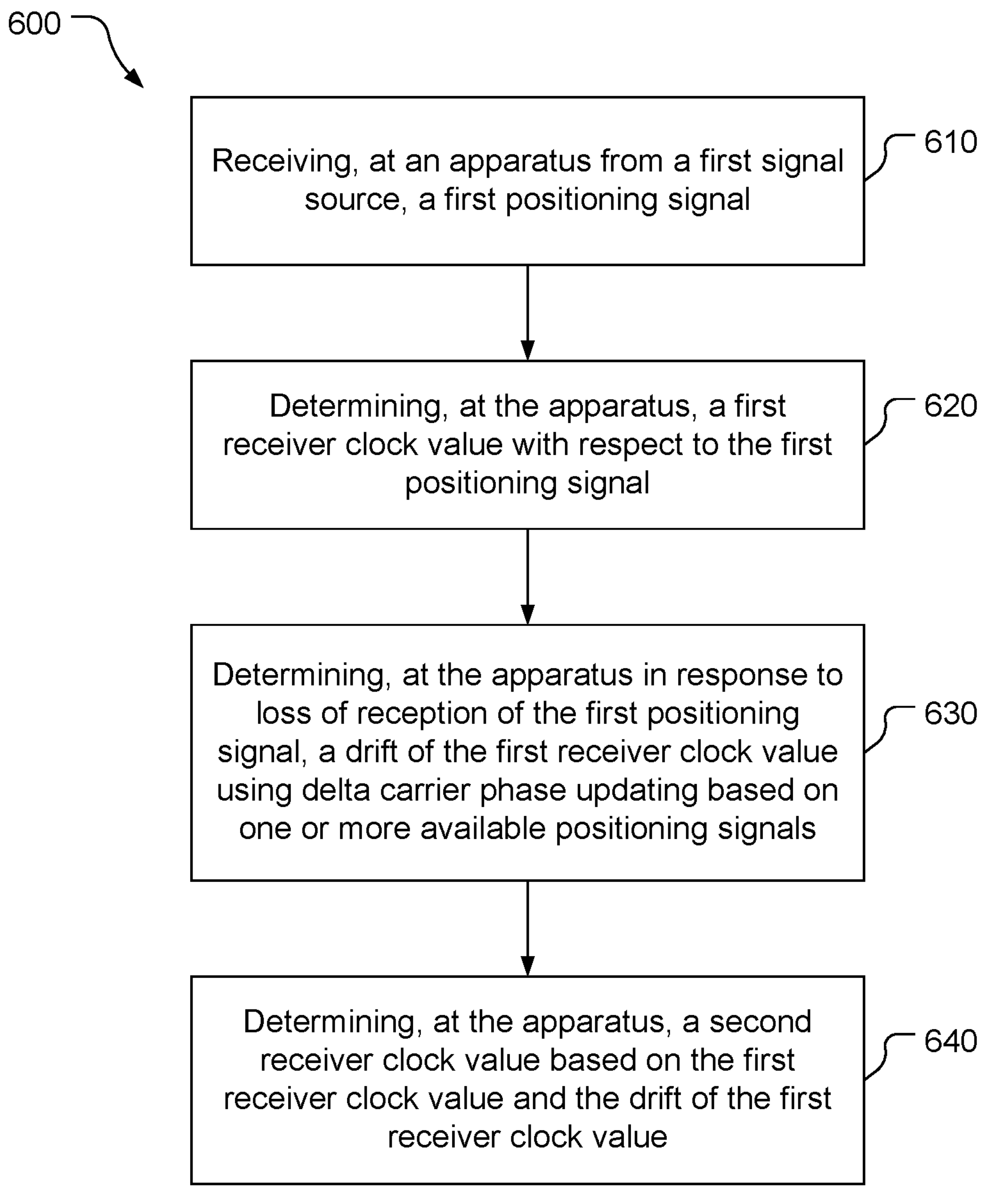
FIG. 6 is a block flow diagram of a positioning method.
Figure 7:
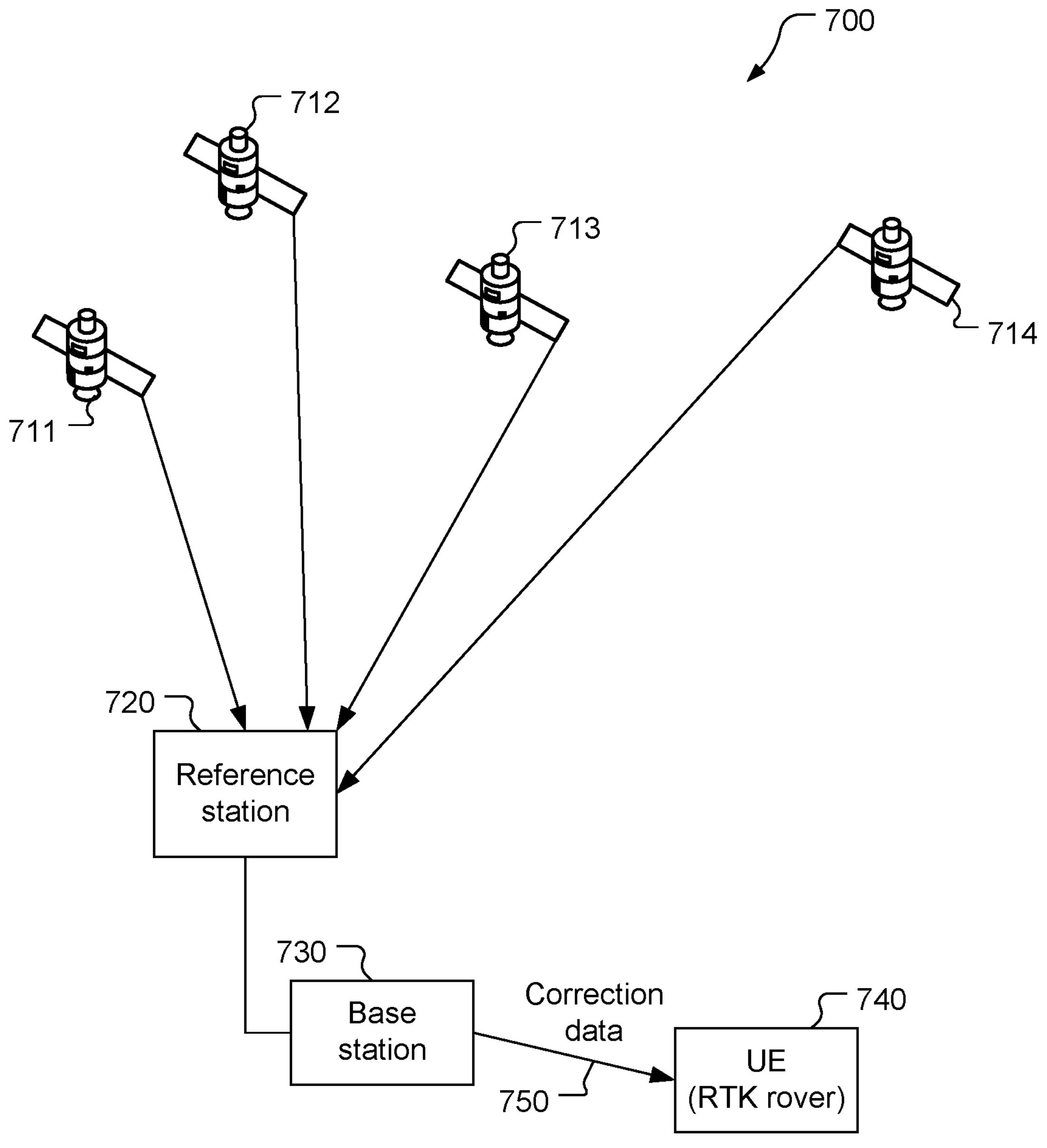
FIG. 7 PRIOR ART
FIG. 7 is a schematic diagram of a positioning system.

Referring to FIG. 6, with further reference to FIGS. 1-5, a positioning method 600 includes the stages shown. The method 600 is, however, an example only and not limiting. The method 600 may be altered, e.g., by having stages added, removed, rearranged, combined, performed concurrently, and/or having single stages split into multiple stages.

At stage 610, the method 600 includes receiving, at an apparatus from a first signal source, a first positioning signal. For example, the receiver 520 (e.g., the SPS receiver 217) may receive a positioning signal such as an SV signal (e.g., GPS L1) from a source, e.g., one of the satellites 191-193, via an antenna, e.g., the antenna 262. The processor 510 may receive the positioning signal from the receiver 520. The receiver 520, e.g., the SPS receiver 217 and the antenna 262, may comprise means for receiving the first positioning signal.

At stage 620, the method 600 includes determining, at the apparatus, a first receiver clock value with respect to the first positioning signal. For example, the processor 510 may determine ΔdT, the RRSD receiver clock bias (of the UE 500 (e.g., of the receiver 520)) on a reference signal (e.g., an SV signal in the Li band (e.g., a user-specified band such as L1, L2, L5)). The processor 510, possibly in combination with the memory 530, may comprise means for determining a first reference receiver clock.

At stage 630, the method 600 includes determining, at the apparatus in response to loss of reception of the first positioning signal, a drift of the first receiver clock value using delta carrier phase updating based on one or more available positioning signals. For example, based on the UE losing the reference signal (e.g., no longer receiving the SV signal in the L1 band, or not being able to process the SV signal in the L1 band with at least a threshold confidence), the processor may apply a filter, e.g., and EKF, to implement DCP updating to determine the $\Delta d\dot{T}$ term, e.g., using Equation (29). The processor 510, possibly in combination with the memory 530, may comprise means for determining the drift of the first receiver clock value.

At stage 640, the method 600 includes determining, at the apparatus, a second receiver clock value based on the first receiver clock value and the drift of the first receiver clock value. For example, the processor 510 may determine a current value of ΔdT using Equation (20), using a previous ΔdT and the $\Delta d\dot{T}$ term. The processor 510, possibly in combination with the memory 530, may comprise means for determining the second receiver clock value.

Implementations of the method 600 may include one or more of the following features. In an example implementation, the method 600 includes determining, at the apparatus based on the second receiver clock value, at least one of an indication of a pseudorange between the first signal source and the apparatus, or an indication of a carrier phase between the first signal source and the apparatus. For example, the processor 510 may determine RRSD clock biases using a pseudorange value, $\Delta P_{Li}$, and/or a carrier phase value, $\Delta\Phi_{Li}$ using an EKF measurement update model described at Equation (30) and an EKF time update model described at Equation (20). The processor 510, possibly in combination with the memory 530, may comprise means for determining at least one of an indication of a pseudorange or an indication of a carrier phase.

Also or alternatively, implementations of the method 600 may include one or more of the following features. In an example implementation, the method 600 includes: receiving, at the apparatus, a second positioning signal corresponding to a second signal source; determining, at the apparatus, a third receiver clock value with respect to the second positioning signal; and determining, at the apparatus and in response to loss of reception of the first positioning signal, a fourth receiver clock value based on the third receiver clock value and the drift of the first receiver clock value. For example, the receiver 520 may receive another positioning signal (e.g., a signal in the GPS L5 band, a signal in the GAL E1 band, a signal in the GAL E5A band) and the processor 510 (e.g., the receiver clock estimation unit 550) may determine a corresponding receiver clock value, e.g., $\Delta dT_{Lj}$ before loss of the reference signal. The processor 510 (e.g., the receiver clock estimation unit 550) may determine, in response to loss of the reference signal, a current receiver clock value based on the receiver clock value bias (determined based on signals before loss of the reference signal) and the clock drift $\Delta d\dot{T}$, e.g., using Equation (20). The receiver 520, e.g., the SPS receiver 217 and the antenna 262, may comprise means for receiving the second positioning signal. The processor 510, possibly in combination with the memory 530, may comprise means for determining the third and fourth receiver clock values. In a further example implementation, the method 600 includes determining, at the apparatus based on the fourth receiver clock value, at least one of an indication of a pseudorange between the second signal source and the apparatus, or an indication of a carrier phase between the second signal source and the apparatus. For example, the processor 510 may determine RRSD clock biases using a pseudorange value, $\Delta P_{Lj}$, and/or a carrier phase value, $\Delta\Phi_{Lj}$ using an EKF measurement update model described at Equation (30) and an EKF time update model described at Equation (20). The processor 510, possibly in combination with the memory 530, may comprise means for determining at least one of an indication of a pseudorange or an indication of a carrier phase based on the fourth receiver clock value.

Also or alternatively, implementations of the method 600 may include one or more of the following features. In an example implementation, the drift of the first receiver clock value is a first drift of the first receiver clock value, and the method 600 further includes determining a second drift of the first receiver clock value through recursive computational estimation based on the first drift of the first receiver clock value and a time between epochs corresponding to the first drift of the first receiver clock value and the second drift of the first receiver clock value. For example, the processor 510 may determine an updated clock drift value using Equation (20), and may use the updated clock drift value to determine one or more other updated values (e.g., pseudodrange(s) and/or carrier phase(s)). The processor 510, possibly in combination with the memory 530, may comprise means for determining the second drift of the first receiver clock value.

IMPLEMENTATION EXAMPLES

Implementation examples are provided in the following numbered clauses.

Clause 1. An apparatus comprising:
- one or more receivers configured to transduce wireless signals into guided signals;
- one or more memories;
- one or more processors, communicatively coupled to the one or more receivers and the one or more memories, configured to:
  - receive a first positioning signal, corresponding to a first signal source, from the one or more receivers;
  - determine a first receiver clock value with respect to the first positioning signal;
  - determine, in response to loss of reception of the first positioning signal, a drift of the first receiver clock value using delta carrier phase updating based on one or more available positioning signals; and
  - determine a second receiver clock value based on the first receiver clock value and the drift of the first receiver clock value.

Clause 2. The apparatus of clause 1, wherein the one or more processors are configured to determine, based on the second receiver clock value, at least one of an indication of a pseudorange between the first signal source and the apparatus, or an indication of a carrier phase between the first signal source and the apparatus.

Clause 3. The apparatus of clause 1, wherein the one or more processors are configured to:
- receive a second positioning signal, corresponding to a second signal source, from the one or more receivers;
- determine a third receiver clock value with respect to the second positioning signal; and
- determine, in response to loss of reception of the first positioning signal, a fourth receiver clock value based on the third receiver clock value and the drift of the first receiver clock value.

Clause 4. The apparatus of clause 3, wherein the one or more processors are configured to determine, based on the fourth receiver clock value, at least one of an indication of a pseudorange between the second signal source and the apparatus, or an indication of a carrier phase between the second signal source and the apparatus.

Clause 5. The apparatus of clause 1, wherein the drift of the first receiver clock value is a first drift of the first receiver clock value and wherein the one or more processors are configured to determine a second drift of the first receiver clock value through recursive computational estimation based on the first drift of the first receiver clock value and a time between epochs corresponding to the first drift of the first receiver clock value and the second drift of the first receiver clock value.

Clause 6. A positioning method comprising:
- receiving, at an apparatus from a first signal source, a first positioning signal;
- determining, at the apparatus, a first receiver clock value with respect to the first positioning signal;
- determining, at the apparatus in response to loss of reception of the first positioning signal, a drift of the first receiver clock value using delta carrier phase updating based on one or more available positioning signals; and
- determining, at the apparatus, a second receiver clock value based on the first receiver clock value and the drift of the first receiver clock value.

Clause 7. The positioning method of clause 6, further comprising determining, at the apparatus based on the second receiver clock value, at least one of an indication of a pseudorange between the first signal source and the apparatus, or an indication of a carrier phase between the first signal source and the apparatus.

Clause 8. The positioning method of clause 6, further comprising:
- receiving, at the apparatus, a second positioning signal corresponding to a second signal source;
- determining, at the apparatus, a third receiver clock value with respect to the second positioning signal; and
- determining, at the apparatus and in response to loss of reception of the first positioning signal, a fourth receiver clock value based on the third receiver clock value and the drift of the first receiver clock value.

Clause 9. The positioning method of clause 8, further comprising determining, at the apparatus based on the fourth receiver clock value, at least one of an indication of a pseudorange between the second signal source and the apparatus, or an indication of a carrier phase between the second signal source and the apparatus.

Clause 10. The positioning method of clause 6, wherein the drift of the first receiver clock value is a first drift of the first receiver clock value, the method further comprising determining a second drift of the first receiver clock value through recursive computational estimation based on the first drift of the first receiver clock value and a time between epochs corresponding to the first drift of the first receiver clock value and the second drift of the first receiver clock value.

Clause 11. An apparatus comprising:
- means for receiving, from a first signal source, a first positioning signal;
- means for determining a first receiver clock value with respect to the first positioning signal;
- means for determining, in response to loss of reception of the first positioning signal, a drift of the first receiver clock value using delta carrier phase updating based on one or more available positioning signals; and
- means for determining a second receiver clock value based on the first receiver clock value and the drift of the first receiver clock value.

Clause 12. The apparatus of clause 11, further comprising means for determining, based on the second receiver clock value, at least one of an indication of a pseudorange between the first signal source and the apparatus, or an indication of a carrier phase between the first signal source and the apparatus.

Clause 13. The apparatus of clause 11, further comprising:
- means for receiving a second positioning signal corresponding to a second signal source;
- means for determining a third receiver clock value with respect to the second positioning signal; and means for determining, in response to loss of reception of the first positioning signal, a fourth receiver clock value based on the third receiver clock value and the drift of the first receiver clock value.

Clause 14. The apparatus of clause 13, further comprising means for determining, based on the fourth receiver clock value, at least one of an indication of a pseudorange between the second signal source and the apparatus, or an indication of a carrier phase between the second signal source and the apparatus.

Clause 15. The apparatus of clause 11, wherein the drift of the first receiver clock value is a first drift of the first receiver clock value, and the apparatus further comprises means for determining a second drift of the first receiver clock value through recursive computational estimation based on the first drift of the first receiver clock value and a time between epochs corresponding to the first drift of the first receiver clock value and the second drift of the first receiver clock value.

Clause 16. A non-transitory, processor-readable storage medium comprising processor-readable instructions to cause a processor of an apparatus to:

receive, from a first signal source, a first positioning signal;

determine a first receiver clock value with respect to the first positioning signal;

determine, in response to loss of reception of the first positioning signal, a drift of the first receiver clock value using delta carrier phase updating based on one or more available positioning signals; and determine a second receiver clock value based on the first receiver clock value and the drift of the first receiver clock value.

Clause 17. The non-transitory, processor-readable storage medium of clause 16, further comprising processor-readable instructions to cause the processor to determine, based on the second receiver clock value, at least one of an indication of a pseudorange between the first signal source and the apparatus, or an indication of a carrier phase between the first signal source and the apparatus.

Clause 18. The non-transitory, processor-readable storage medium of clause 16, further comprising processor-readable instructions to cause the processor to:

receive a second positioning signal corresponding to a second signal source;

determine a third receiver clock value with respect to the second positioning signal; and determine, in response to loss of reception of the first positioning signal, a fourth receiver clock value based on the third receiver clock value and the drift of the first receiver clock value.

Clause 19. The non-transitory, processor-readable storage medium of clause 18, further comprising processor-readable instructions to cause the processor to determine, based on the fourth receiver clock value, at least one of an indication of a pseudorange between the second signal source and the apparatus, or an indication of a carrier phase between the second signal source and the apparatus.

Clause 20. The non-transitory, processor-readable storage medium of clause 16, wherein the drift of the first receiver clock value is a first drift of the first receiver clock value, and the non-transitory, processor-readable storage medium further comprising processor-readable instructions to cause the processor to determine a second drift of the first receiver clock value through recursive computational estimation based on the first drift of the first receiver clock value and a time between epochs corresponding to the first drift of the first receiver clock value and the second drift of the first receiver clock value.

Other Considerations

Other examples and implementations are within the scope of the disclosure and appended claims. For example, due to the nature of software and computers, functions described above can be implemented using software executed by a processor, hardware, firmware, hardwiring, or a combination of any of these. Features implementing functions may also be physically located at various positions, including being distributed such that portions of functions are implemented at different physical locations.

As used herein, the singular forms “a,” “an,” and “the” include the plural forms as well, unless the context clearly indicates otherwise. The terms “comprises,” “comprising,” “includes,” and/or “including,” as used herein, specify the presence of stated features, integers, steps, operations, elements, and/or components, but do not preclude the presence or addition of one or more other features, integers, steps, operations, elements, components, and/or groups thereof.

As used herein, unless otherwise stated, a statement that a function or operation is “based on” an item or condition means that the function or operation is based on the stated item or condition and may be based on one or more items and/or conditions in addition to the stated item or condition.

Also, as used herein, “or” as used in a list of items (possibly prefaced by “at least one of” or prefaced by “one or more of”) indicates a disjunctive list such that, for example, a list of “at least one of A, B, or C,” or a list of “one or more of A, B, or C” or a list of “A or B or C” means A, or B, or C, or AB (A and B), or AC (A and C), or BC (B and C), or ABC (i.e., A and B and C), or combinations with more than one feature (e.g., AA, AAB, ABBC, etc.). Thus, a recitation that an item, e.g., a processor, is configured to perform a function regarding at least one of A or B, or a recitation that an item is configured to perform a function A or a function B, means that the item may be configured to perform the function regarding A, or may be configured to perform the function regarding B, or may be configured to perform the function regarding A and B. For example, a phrase of “a processor configured to measure at least one of A or B” or “a processor configured to measure A or measure B” means that the processor may be configured to measure A (and may or may not be configured to measure B), or may be configured to measure B (and may or may not be configured to measure A), or may be configured to measure A and measure B (and may be configured to select which, or both, of A and B to measure). Similarly, a recitation of a means for measuring at least one of A or B includes means for measuring A (which may or may not be able to measure B), or means for measuring B (and may or may not be configured to measure A), or means for measuring A and B (which may be able to select which, or both, of A and B to measure). As another example, a recitation that an item, e.g., a processor, is configured to at least one of perform function X or perform function Y means that the item may be configured to perform the function X, or may be configured to perform the function Y, or may be configured to perform the function X and to perform the function Y. For example, a phrase of “a processor configured to at least one of measure X or measure Y” means that the processor may be configured to measure X (and may or may not be configured to measure Y), or may be configured to measure Y (and may or may not be configured to measure X), or may be configured to measure X and to measure Y (and may be configured to select which, or both, of X and Y to measure).

Substantial variations may be made in accordance with specific requirements. For example, customized hardware might also be used, and/or particular elements might be implemented in hardware, software (including portable software, such as applets, etc.) executed by a processor, or both. Further, connection to other computing devices such as network input/output devices may be employed. Components, functional or otherwise, shown in the figures and/or discussed herein as being connected or communicating with each other are communicatively coupled unless otherwise noted. That is, they may be directly or indirectly connected to enable communication between them.

The systems and devices discussed above are examples. Various configurations may omit, substitute, or add various procedures or components as appropriate. For instance, features described with respect to certain configurations may be combined in various other configurations. Different aspects and elements of the configurations may be combined in a similar manner. Also, technology evolves and, thus, many of the elements are examples and do not limit the scope of the disclosure or claims.

A wireless communication system is one in which communications are conveyed wirelessly, i.e., by electromagnetic and/or acoustic waves propagating through atmospheric space rather than through a wire or other physical connection. A wireless communication network may not have all communications transmitted wirelessly, but is configured to have at least some communications transmitted wirelessly. Further, the term "wireless communication device," or similar term, does not require that the functionality of the device is exclusively, or evenly primarily, for communication, or that the device be a mobile device, but indicates that the device includes wireless communication capability (one-way or two-way), e.g., includes at least one radio (each radio being part of a transmitter, receiver, or transceiver) for wireless communication.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations provides a description for implementing described techniques. Various changes may be made in the function and arrangement of elements.

The terms "processor-readable medium," "machine-readable medium," and "computer-readable medium," as used herein, refer to any medium that participates in providing data that causes a machine to operate in a specific fashion. Using a computing platform, various processor-readable media might be involved in providing instructions/code to processor(s) for execution and/or might be used to store and/or carry such instructions/code (e.g., as signals). In many implementations, a processor-readable medium is a physical and/or tangible storage medium. Such a medium may take many forms, including but not limited to, non-volatile media and volatile media. Non-volatile media include, for example, optical and/or magnetic disks. Volatile media include, without limitation, dynamic memory.

Having described several example configurations, various modifications, alternative constructions, and equivalents may be used. For example, the above elements may be components of a larger system, wherein other rules may take precedence over or otherwise modify the application of the invention. Also, a number of operations may be undertaken before, during, or after the above elements are considered. Accordingly, the above description does not bound the scope of the claims.

A statement that a value exceeds (or is more than or above) a first threshold value is equivalent to a statement that the value meets or exceeds a second threshold value that is slightly greater than the first threshold value, e.g., the second threshold value being one value higher than the first threshold value in the resolution of a computing system. A statement that a value is less than (or is within or below) a first threshold value is equivalent to a statement that the value is less than or equal to a second threshold value that is slightly lower than the first threshold value, e.g., the second threshold value being one value lower than the first threshold value in the resolution of a computing system.

The invention claimed is:

1. An apparatus comprising:

one or more receivers configured to transduce wireless signals into guided signals;

one or more memories;

one or more processors, communicatively coupled to the one or more receivers and the one or more memories, configured to:

receive a first positioning signal, corresponding to a first signal source, from the one or more receivers;

determine a first receiver clock value with respect to the first positioning signal;

determine, in response to loss of reception of the first positioning signal, a drift of the first receiver clock value using delta carrier phase updating based on one or more available positioning signals, wherein the drift of the first receiver clock value is determined by estimating, from delta carrier phase values of the one or more available positioning signals, a common receiver clock rate applicable to both the first signal source and one or more available signal sources; and determine a second receiver clock value based on the first receiver clock value and the drift of the first receiver clock value.

2. The apparatus of claim 1, wherein the one or more processors are configured to determine, based on the second receiver clock value, at least one of an indication of a pseudorange between the first signal source and the apparatus, or an indication of a carrier phase between the first signal source and the apparatus.

3. The apparatus of claim 1, wherein the one or more processors are configured to:

receive a second positioning signal, corresponding to a second signal source, from the one or more receivers;

determine a third receiver clock value with respect to the second positioning signal; and determine, in response to loss of reception of the first positioning signal, a fourth receiver clock value based on the third receiver clock value and the drift of the first receiver clock value.

4. The apparatus of claim 3, wherein the one or more processors are configured to determine, based on the fourth receiver clock value, at least one of an indication of a pseudorange between the second signal source and the apparatus, or an indication of a carrier phase between the second signal source and the apparatus.

5. The apparatus of claim 1, wherein the drift of the first receiver clock value is a first drift of the first receiver clock value and wherein the one or more processors are configured to determine a second drift of the first receiver clock value through recursive computational estimation based on the first drift of the first receiver clock value and a time between epochs corresponding to the first drift of the first receiver clock value and the second drift of the first receiver clock value.

6. A positioning method comprising:

receiving, at an apparatus from a first signal source, a first positioning signal;

determining, at the apparatus, a first receiver clock value with respect to the first positioning signal;

determining, at the apparatus in response to loss of reception of the first positioning signal, a drift of the first receiver clock value using delta carrier phase updating based on one or more available positioning signals, wherein the drift of the first receiver clock value is determined by estimating, from delta carrier phase values of the one or more available positioning signals, a common receiver clock rate applicable to the first signal source and one or more available signal sources; and determining, at the apparatus, a second receiver clock value based on the first receiver clock value and the drift of the first receiver clock value.

7. The positioning method of claim 6, further comprising determining, at the apparatus based on the second receiver clock value, at least one of an indication of a pseudorange between the first signal source and the apparatus, or an indication of a carrier phase between the first signal source and the apparatus.

8. The positioning method of claim 6, further comprising:

receiving, at the apparatus, a second positioning signal corresponding to a second signal source;

determining, at the apparatus, a third receiver clock value with respect to the second positioning signal; and determining, at the apparatus and in response to loss of reception of the first positioning signal, a fourth receiver clock value based on the third receiver clock value and the drift of the first receiver clock value.

9. The positioning method of claim 8, further comprising determining, at the apparatus based on the fourth receiver clock value, at least one of an indication of a pseudorange between the second signal source and the apparatus, or an indication of a carrier phase between the second signal source and the apparatus.

10. The positioning method of claim 6, wherein the drift of the first receiver clock value is a first drift of the first receiver clock value, the positioning method further comprising determining a second drift of the first receiver clock value through recursive computational estimation based on the first drift of the first receiver clock value and a time between epochs corresponding to the first drift of the first receiver clock value and the second drift of the first receiver clock value.

11. An apparatus comprising:

means for receiving, from a first signal source, a first positioning signal;

means for determining a first receiver clock value with respect to the first positioning signal;

means for determining, in response to loss of reception of the first positioning signal, a drift of the first receiver clock value using delta carrier phase updating based on one or more available positioning signals, wherein the means for determining the drift of the first receiver clock value includes means for estimating, from delta carrier phase values of the one or more available positioning signals, a common receiver clock rate applicable to the first signal source and one or more available signal sources; and means for determining a second receiver clock value based on the first receiver clock value and the drift of the first receiver clock value.

12. The apparatus of claim 11, further comprising means for determining, based on the second receiver clock value, at least one of an indication of a pseudorange between the first signal source and the apparatus, or an indication of a carrier phase between the first signal source and the apparatus.

13. The apparatus of claim 11, further comprising:

means for receiving a second positioning signal corresponding to a second signal source;

means for determining a third receiver clock value with respect to the second positioning signal; and means for determining, in response to loss of reception of the first positioning signal, a fourth receiver clock value based on the third receiver clock value and the drift of the first receiver clock value.

14. The apparatus of claim 13, further comprising means for determining, based on the fourth receiver clock value, at least one of an indication of a pseudorange between the second signal source and the apparatus, or an indication of a carrier phase between the second signal source and the apparatus.

15. The apparatus of claim 11, wherein the drift of the first receiver clock value is a first drift of the first receiver clock value, and the apparatus further comprises means for determining a second drift of the first receiver clock value through recursive computational estimation based on the first drift of the first receiver clock value and a time between epochs corresponding to the first drift of the first receiver clock value and the second drift of the first receiver clock value.

16. A non-transitory, processor-readable storage medium comprising processor-readable instructions to cause a processor of an apparatus to:

receive, from a first signal source, a first positioning signal;

determine a first receiver clock value with respect to the first positioning signal;

determine, in response to loss of reception of the first positioning signal, a drift of the first receiver clock value using delta carrier phase updating based on one or more available positioning signals, wherein the drift of the first receiver clock value is determined by estimating, from delta carrier phase values of the one or more available positioning signals, a common receiver clock rate applicable to the first signal source and one or more available signal sources; and determine a second receiver clock value based on the first receiver clock value and the drift of the first receiver clock value.

17. The non-transitory, processor-readable storage medium of claim 16, further comprising processor-readable instructions to cause the processor to determine, based on the second receiver clock value, at least one of an indication of a pseudorange between the first signal source and the apparatus, or an indication of a carrier phase between the first signal source and the apparatus.

18. The non-transitory, processor-readable storage medium of claim 16, further comprising processor-readable instructions to cause the processor to:

receive a second positioning signal corresponding to a second signal source;

determine a third receiver clock value with respect to the second positioning signal; and determine, in response to loss of reception of the first positioning signal, a fourth receiver clock value based on the third receiver clock value and the drift of the first receiver clock value.

19. The non-transitory, processor-readable storage medium of claim 18, further comprising processor-readable instructions to cause the processor to determine, based on the fourth receiver clock value, at least one of an indication of a pseudorange between the second signal source and the apparatus, or an indication of a carrier phase between the second signal source and the apparatus.

20. The non-transitory, processor-readable storage medium of claim 16, wherein the drift of the first receiver clock value is a first drift of the first receiver clock value, and the non-transitory, processor-readable storage medium further comprising processor-readable instructions to cause the processor to determine a second drift of the first receiver clock value through recursive computational estimation based on the first drift of the first receiver clock value and a time between epochs corresponding to the first drift of the first receiver clock value and the second drift of the first receiver clock value.

* * * * *